US005802502A

United States Patent [19]
Gell et al.

[11] Patent Number: 5,802,502
[45] Date of Patent: Sep. 1, 1998

[54] SYSTEM FOR SELECTIVE COMMUNICATION CONNECTION BASED ON TRANSACTION PRICING SIGNALS

[75] Inventors: Michael Anthony Gell; Michael Robert Wistow Manning; Jose-Luis Fernandez-Villacanas Martin, all of Suffolk, England

[73] Assignee: British Telecommunications public limited company, London, England

[21] Appl. No.: 233,631

[22] Filed: Apr. 26, 1994

[30] Foreign Application Priority Data

May 24, 1993 [GB] United Kingdom ............... 9310663
Feb. 23, 1994 [EP] European Pat. Off. ........... 94301266

[51] Int. Cl.$^6$ ............................. G06F 17/60; H04M 15/00
[52] U.S. Cl. ................................. 705/37; 705/34; 379/114
[58] Field of Search ................................. 364/401, 402, 364/406; 379/111, 112, 114, 115, 120; 370/17; 395/201, 210, 235, 234, 230, 237; 705/1, 10, 35, 34, 30, 37

[56] References Cited

U.S. PATENT DOCUMENTS

| | | | |
|---|---|---|---|
| 4,410,765 | 10/1983 | Hestad et al. | 379/112 |
| 4,879,742 | 11/1989 | Taniguchi et al. | |
| 4,992,940 | 2/1991 | Dworkin | 364/401 |
| 5,067,127 | 11/1991 | Ochiai | |
| 5,173,933 | 12/1992 | Jabs et al. | 379/111 |
| 5,216,591 | 6/1993 | Nemirovsky et al. | 364/402 |
| 5,303,297 | 4/1994 | Hillis | 379/114 |
| 5,335,268 | 8/1994 | Kelly, Jr. et al. | 379/112 |
| 5,425,084 | 6/1995 | Brinskele | 379/112 |
| 5,473,630 | 12/1995 | Penzias et al. | 379/115 |
| 5,515,425 | 5/1996 | Penzias et al. | 379/114 |

FOREIGN PATENT DOCUMENTS

| | | |
|---|---|---|
| 0258654 | 3/1988 | European Pat. Off. . |
| 0526118 A2 | 2/1993 | European Pat. Off. . |
| 2-94755 | 4/1990 | Japan . |
| 2001788 | 3/1982 | United Kingdom . |
| WO 92/01350 | 1/1992 | WIPO . |
| WO 93/16543 | 8/1993 | WIPO . |

OTHER PUBLICATIONS

Lee et al, "A Framework For Controlling Cooperative Agents", Jul. 1993, pp. 8–16, IEEE Computer.
Seveque et al, "ABC—A State–of–the–art Private Networking Solution", ONDE Electrique, vol. 71, No. 5, Sep. 1991, Paris, France, pp. 49–53.
Patent Abstracts of Japan, vol. 14, No. 292 (E–944) 25 Jun. 1990 & JP A,02 094 755 (Hitachi) 5 Apr. 1990.
Waldspurger et al, "Spawn: A Distributed Computational Economy", IEEE Transactions on Software Engineering, vol. 18, No., Feb. 1992, pp. 103–117.
Wellman, "A Market–Oriented Programming Environment and its Application to Distributed Multicommodity Flow Problems", Journal of Artificial Intelligence Research 1 (1993) pp. 1–23.

Primary Examiner—Robert A. Weinhardt
Attorney, Agent, or Firm—Nixon & Vanderhye P.C.

[57] ABSTRACT

A communications network in which user equipment is provided with a selecting device which communicates with a pricing device in service provider equipment. When communications or other services are required, the selection circuit polls a plurality of service providers, and the pricing circuit of each service provider generates a price signal indicating the level of price for its services. The selection circuit then selects a service provider, based on price (and also other factors such as quality of service).

43 Claims, 11 Drawing Sheets

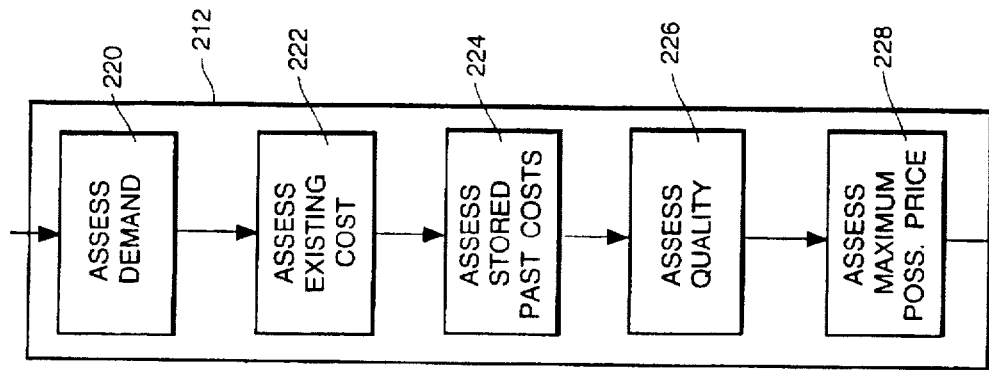
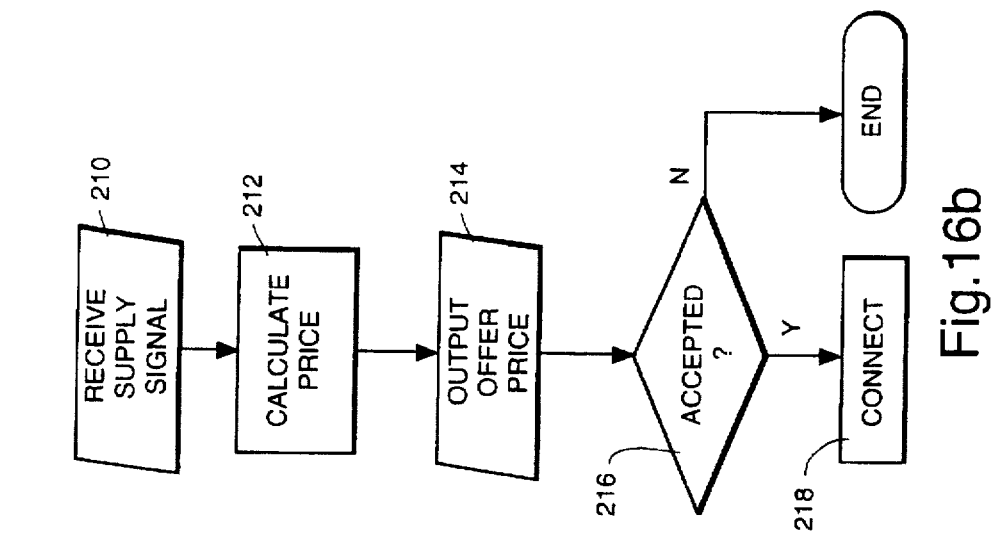
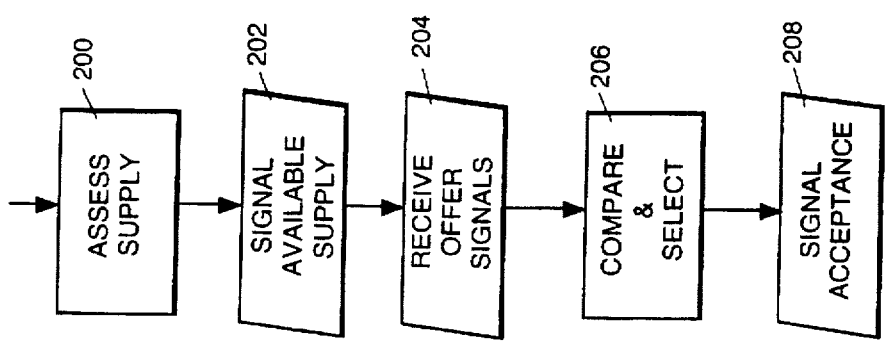

SYSTEM FOR SELECTIVE COMMUNICATION CONNECTION BASED ON TRANSACTION PRICING SIGNALS

This invention relates to communications apparatus, and more particularly communications apparatus for supplying and acquiring products and services from one of a plurality of suppliers.

The present invention is chiefly, but not exclusively, concerned with the supply of telecommunications services to a customer from a plurality of telecommunications suppliers. In many countries (for example the UK) telecommunications services are available to a customer from more than one telecommunications company. The customer therefore has the choice of obtaining services from more than one source, and this choice is exercised on the basis of price, quality of service and other factors (including brand loyalty). Different telecommunications providers may be accessible through a common telecommunications network. For example, in the UK, a telephone which is primarily part of a telecommunications network operated by a first supplier may carry buttons enabling the user to effect connection to the networks of other suppliers via that of the first.

At present, different telecommunications suppliers provide services at different prices, which may be calculated on different bases. Many service suppliers charge on the basis of time used, but different rates may be used in different time bands, and over different distance bands (e.g. local, long distance or international). The time and distance bands employed by different suppliers may differ, and additionally, different suppliers may offer features such as discounts for bulk usage, subscriptions, or lower prices at times of low network usage.

All of this makes it difficult, time consuming and expensive for a user of telecommunications services to make an informed decision based on price, and hinders the extent to which competition can regulate pricing within the market for telecommunications services. In general, users tend to form long term contracts with particular telecommunications service providers, and the service providers set prices relatively infrequently, in advance of each such long term contract. The overall level of prices (determined, for example, by reference to a basket of different services) may be moderated by some Government regulatory agency.

The present invention, in one aspect, generally concerns the provision of a telecommunications system comprising user negotiation equipment which is arranged to communicate with a number of telecommunications service providers to receive price data from each provider, and to select one service provider on the basis of the price data; and service provider negotiation equipment which is arranged to generate an estimated price for providing services and to communicate that price to the user equipment. The invention equally concerns both the user equipment and the supplier equipment independently of each other; indeed, the two may be located in different national jurisdictions.

Preferably, the prices are set in the short term, very preferably in response to each service requirement of the user negotiation equipment. This 'real-time' price setting further makes possible more complex negotiation transactions, such as auction, barter or exchange transactions, directly and in real time between the user and supplier apparatus.

Thus, in one exemplary embodiment, where a telecommunications customer wishes to initiate a plain old telephone service (POTS) call, upon actuating his handset equipment and dialling a destination, the handset equipment issues a polling signal to the telecommunications network indicating the destination of the call, and service providers connected to the network transmit, in reply, a price signal (e.g. a price per unit time, for example in pence per minute). The customer equipment then selects the network offering the lowest price, and signals to that supplier a requirement to connect the call. Thus, every call transaction can be made on the basis of competitive pricing. Given that, in future, telecommunications suppliers may comprise not only traditional telecommunications operating companies, but also owners of private networks (such as power, transport or other utilities) who have spare capacity, or large scale users of telecommunications services who have spare capacity, the present invention provides a mechanism for extremely effective resource allocation in which any potential telecommunications service supplier is able to propose a price which reflects the instantaneous amount of capacity available, thus matching telecommunications services users to available communications capacity, (even if only briefly available) as well as favouring efficient telecommunications suppliers.

In fact, the invention may also be applied within a single telecommunications network where multiple routes between points of the network are available; each exchange or switching centre in the network, and the links between, can effectively act as a cost centre and when there is the option of switching a message through to several different exchanges or switching centres, each may issue a price signal, the message being switched on the route offering the lowest price. The same principle can also extend, for example, to other communications network elements (e.g. databases). Thus, the network can be effectively "self-organising", allocating its resources in accordance with market principles (subject to macro economic, regulatory or other constraints).

Further the invention may be extended to services other than telecommunications services; for instance, providers of products or services such as entertainment providers, educational establishments, special interest groupings, or shops may likewise have pricing and price signalling devices, interconnected with a user via the telecommunications network, so that a user can use his/her telecommunications terminal to order goods or services from one of a plurality of competing sources.

It might be considered that the invention could equally be performed by human beings. However, consideration will show that this is not so; for example, in its application to telecommunications, it would clearly be impossible for a user to obtain competing quotes in advance for making a telephone conversation by a process of making several preliminary telephone conversations to establish price and then a further conversation to instruct the successful bidder, since this process would firstly cost more than the call for which the quotes were being provided, and would secondly (in preparing quotes, negotiating, deciding and placing the call) take such a long time that the ability to take advantage of real time, short term fluctuations in the supply and demand of telecommunication services would be lost.

Many other preferred features, aspects, embodiments and applications of the invention will be apparent from the following description and claims.

Embodiments of the invention will now be described, by way of example only, with reference to the accompanying drawings, in which.

Figure 1:
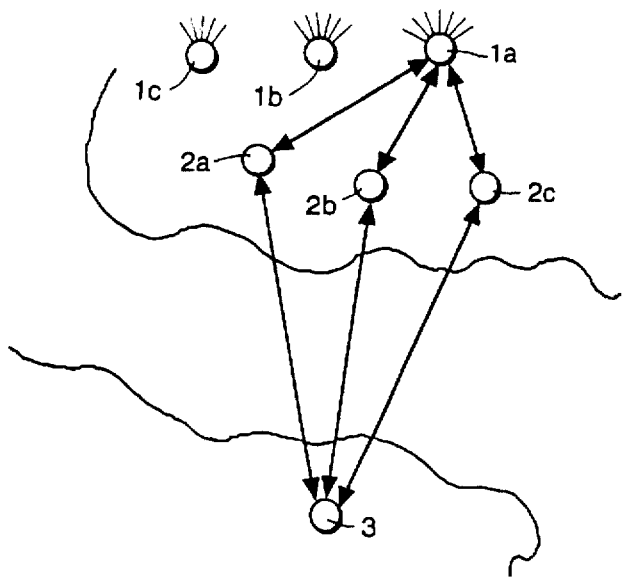
FIG. 1 shows schematically the connection between local and long distance networks in a first embodiment according to the invention.
Figure 3:
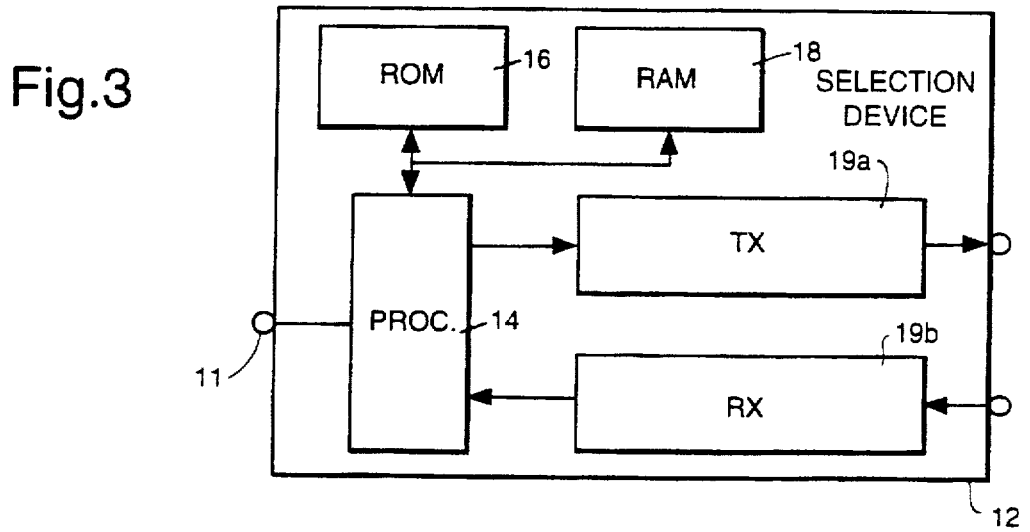
FIG. 3 is a block diagram showing schematically the structure of a selection device forming part of the station in FIG. 2.
Figure 4:
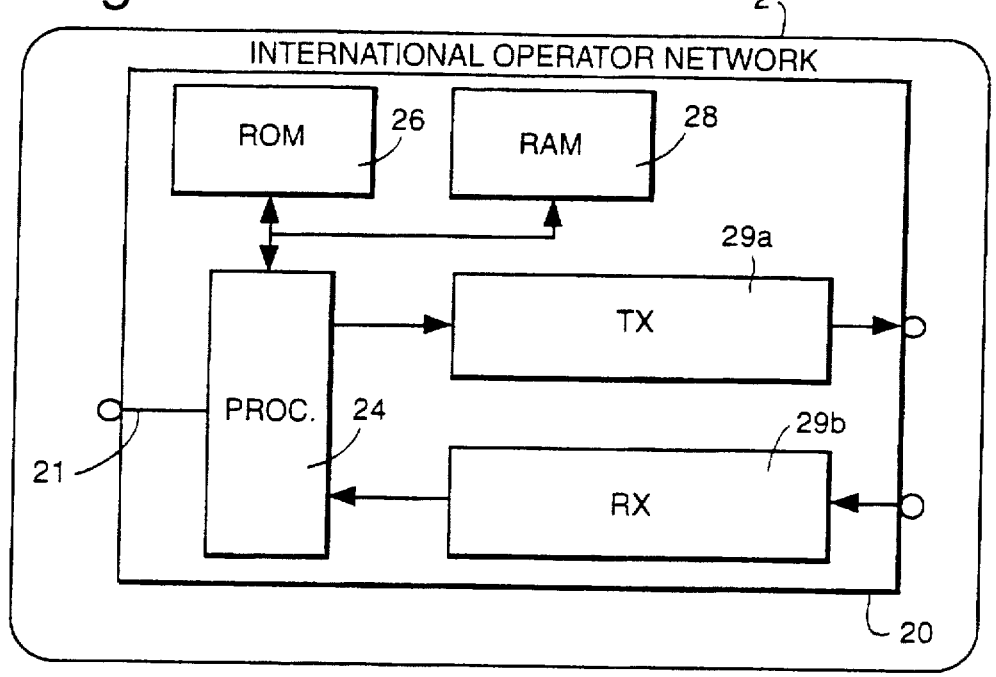
FIG. 4 is a block diagram showing schematically the structure of a pricing device within a long distance network of FIG. 1.
Figure 14:
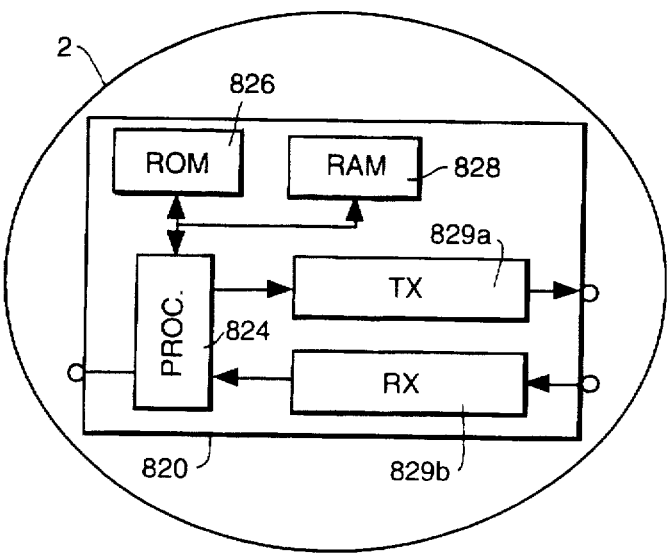
Figure 15:
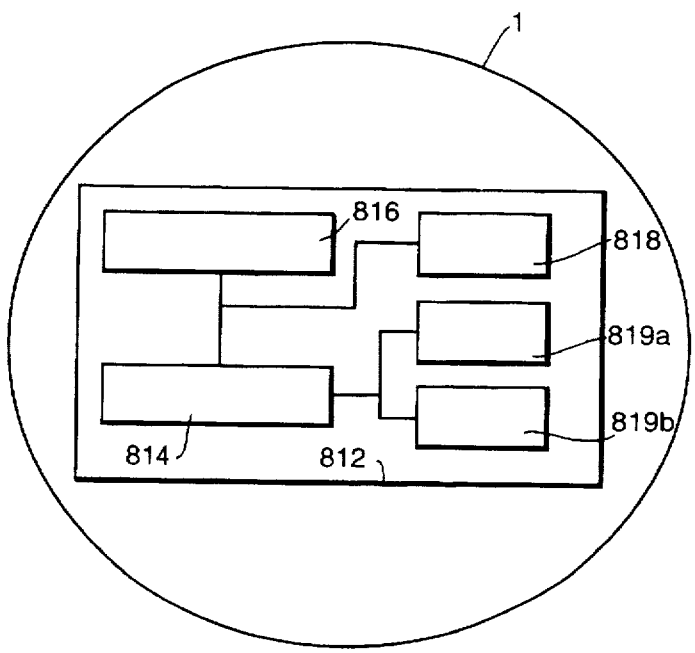
Figure 17B:
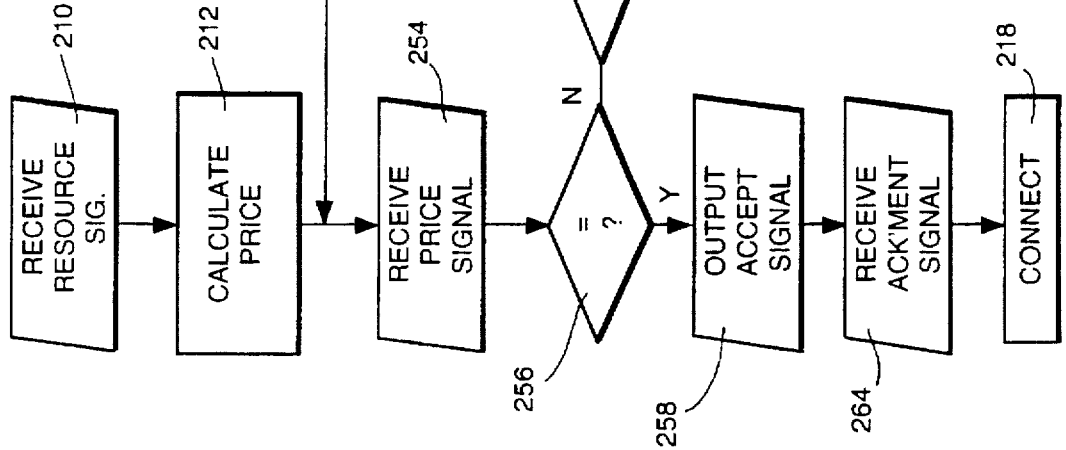
Figure 17A:
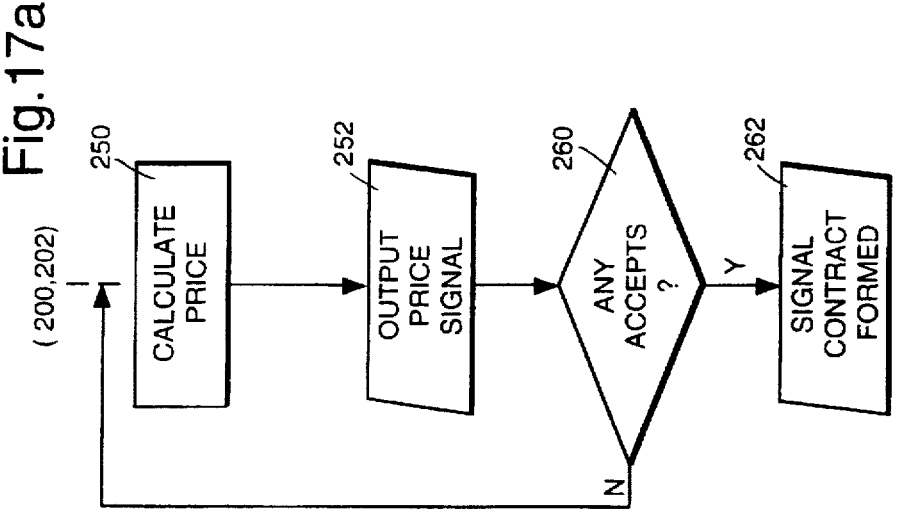

FIG. 14 corresponds to FIG. 4 and indicates the structure of a selection device according to a sixth embodiment of the invention (to which FIG. 1 is applicable);

FIG. 15 corresponds to FIG. 3 and illustrates schematically the structure of a binding device according to the sixth embodiment;

FIG. 16a is a flow diagram showing schematically the process performed by the selection device in this embodiment; and FIG. 16b is a flow diagram showing schematically the process performed by the binding device of FIG. 15 in this embodiment; and FIG. 16c shows in greater detail the process making up one of the steps of FIG. 16b in this embodiment;

FIG. 17a is a flow diagram showing schematically the process of operation of a selection device in a seventh embodiment; and FIG. 17b is a flow diagram showing schematically the operation of a bidding device of the seventh embodiment.

First Embodiment

A first embodiment of the invention will now be described, in which the invention is applied in the context of long distance telecommunications.

Referring to FIG. 1, the networks 1 of several regional telecommunications operators (for example, local or national telecommunications operators or private networks) are designated 1a, 1b, 1c. Each is connected in turn to a plurality of long distance operators (designated 2a, 2b, 2c) which supply intercontinental communications channels via satellites, or subsea or transcontinental cables to a distant station 3. Each of the local operators 1a, 1b or 1c can connect with the distant station 3 via any of the long distance operators 2a, 2b, 2c.

Figure 2:
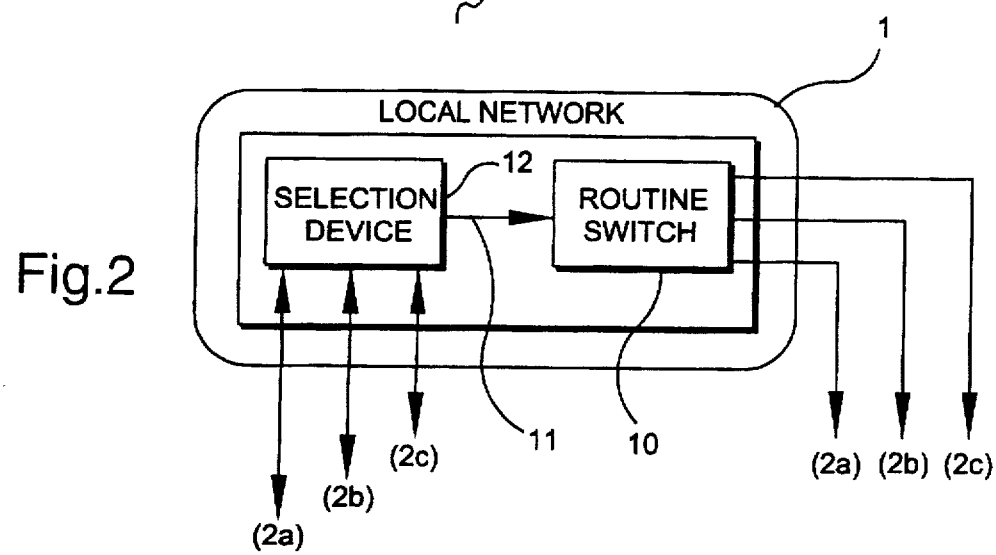
FIG. 2 is a block diagram showing schematically the components of an exchange station within a local network forming part of FIG. 1.

Referring to FIG. 2, each of the local networks 1a–1c contains a routing switch or exchange 10 which selectively interconnects the network 1 with one of the operators 2a, 2b, 2c, to route long distance traffic via that long distance operator. Such switches form part of existing telecommunications networks.

Also provided is a selection device 12, which is arranged to be in signalling contact with the networks 2a, 2b, 2c to exchange price information, as discussed in greater detail below.

Referring to FIG. 3, the selection device 12 comprises a digital processor 14, a program storage memory 16 storing the program controlling the operation of the processor 14, a working memory 18 storing data employed in operation of the processor 14, and transmit and receive circuits 19a, 19b (comprising, for example, wavelength division or time division multiplexing and demultiplexing devices) via which the processor 14 communicates with the network 1 and hence the long distance operators 2a–2c.

A control line 11 runs from the selector circuit 12 to the switch 10; conveniently, the two are co-located in a switching centre or exchange station in the network 1.

Referring to FIG. 4, each international operator network 2a, 2b, 2c includes a pricing device 20 comprising a processor 24, program storage memory 26, working memory 28, and transmit and receive circuits 29a, 29b, the latter two being for communication with the selection device 12. The processor 24 also has an input line 21 for receiving input data concerning, for example, current availability of long distance channels, from a network control centre at which the pricing device 20 may be located.

The processors 14, 24 may execute other tasks and may, for example, form part of network planning or network or service management computing devices.

Figure 5A:
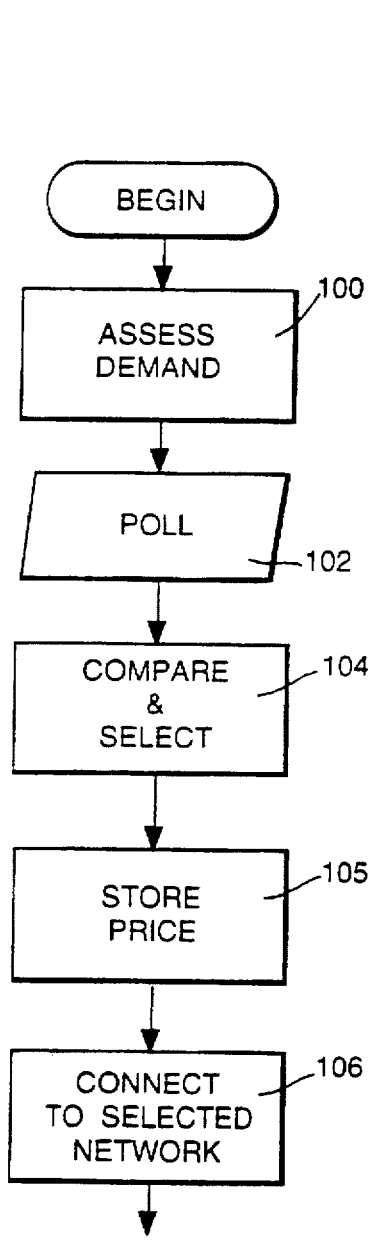
FIG. 5a is a flow diagram showing schematically the process performed by the selection device of FIG. 3.
Figure 5B:
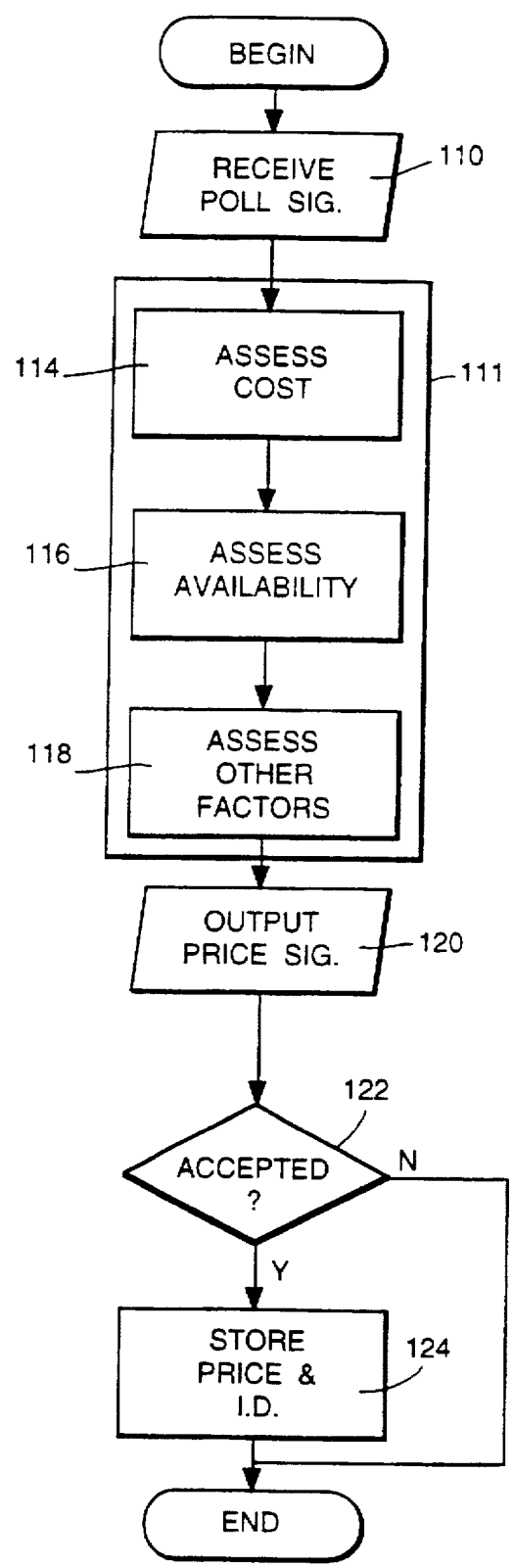
FIG. 5b is a flow diagram showing schematically the process performed by the pricing device of FIG. 4.
Figure 6:
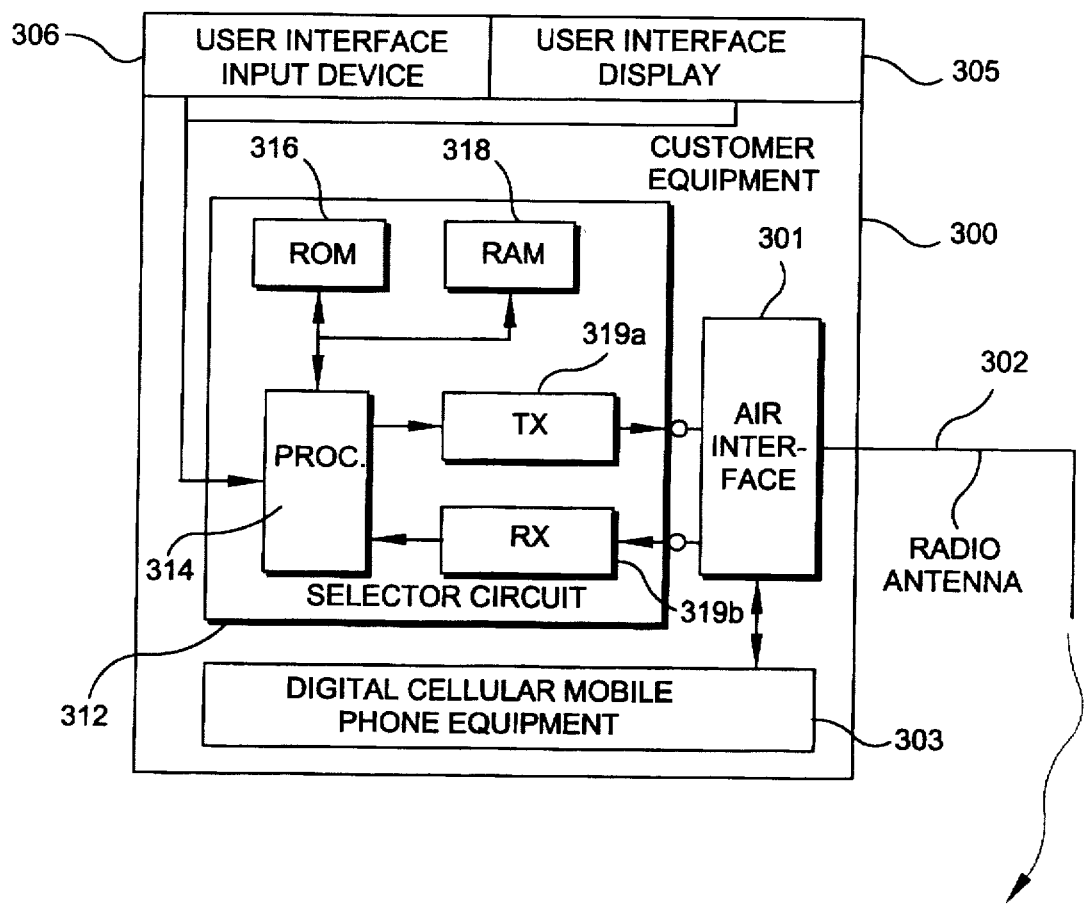
FIG. 6 is a block diagram showing the structure of customer terminal equipment according to a second embodiment of the invention.

Referring to FIGS. 5 and 6, one example of a method of operating the apparatus of FIGS. 1 to 4 will now be described.

Referring to FIG. 5a, at predetermined intervals, the selection device processor 14 of each network 1a–1c is arranged to assess its demand for long range calls in a step 100 (for example by examining the current number of such calls in progress, and/or by using stored average data indicating the typical demand for long distance telecommunications at the relevant time of day, possibly including consideration of the day type—holiday, working day, weekend etc.).

The processor 14 then polls the long distance operators 2a–2c in a step 102, by formulating a tender signal (preferably also indicating the approximate predicted level of its own demand or requirement) and transmitting this via the transmitting circuit 19a to some or all the long distance operators 2a–2c. This may be preceded by some initial 'handshaking' signalling to establish the identities of the selection device 12 and pricing device 20.

Referring to FIG. 5b, within each international operator network 2a–2c, the pricing device processor 24 is arranged to note the reception via the receive circuit 29b, of a tender signal in a step 110, to frame a price in a step 111, and to output a corresponding price level signal via the transmitter circuit 29a in a step 120. In this embodiment, the price calculation step 111 occurs after reception of a tender signal, but in other embodiments it would be possible to calculate the price level less frequently or at different times and to store price level data in advance.

In one method of calculating a price, the calculation step 111 comprises a step 114 of calculating a cost element (this is generally dictated by long term factors such as labour, building, fixed installation, maintenance, and other service provision costs and hence may be a stored constant, or a relatively infrequently updated stored value); a step 116 of assessing the availability of long distance telecommunications resources (e.g. by monitoring the number of transatlantic cable channels or satellite channels which are currently free (or inferring this from those which are busy, and/or by using long term averages representing the average level of availability at the time of day concerned); and a step 118 in which other pricing factors are taken into account.

One of these other factors may be, for example, "feedback" about the level of price charged by other long distance operators; either in the form of direct information on their prices which may be publicly available, or indirectly in the form of a count of the number of past occasions on which the processor 14 has issued price level signals but has failed to secure additional business.

One simple algorithm for generating a price signal is as follows, where the cost is C, and the available capacity of the long distance operator is A;

$$price = ((1+a) \cdot C) + (b \cdot (A_{tot}/A)) - (c \cdot N)$$

where N is the number of occasions on which the processor 24 has issued a pricing signal since the last occasion on which its pricing signal was accepted; $A_{tot}$ is the total capacity of the long distance operator for placing long distance communications; and a, b and c are constants.

Thus, using this equation, the processor 24 sets the initial price at some percentage above the cost, and then varies the price in inverse relation to the current availability of resources (according to the so-called 'law of supply') and in direct relation to the rate of take-up of services (i.e. according to the so-called 'law of demand'). Where the initial price is unreasonably high, by contrast with that of the competing long distance networks, it will be reduced progressively until it intercepts those of the competing networks, making each long distance operator competitive.

The level of demand transmitted by the processor 14 may be taken into account when setting the price, by adding it to the existing demand to calculate the (predicted) availability A.

The price signal, in addition to indicating the level of price (e.g. per minute, per packet or per bit) may also give other indications of the character or quality of the services to be provided; for example, an indication of the expected mode of transmission (e.g. satellite or fixed link); an indication of the security of transmission (e.g. encoded, encrypted or unencrypted), or an indication of channel parameters including parameters related to quality of service, such as delay and/or bit error rate (BER).

On receiving the price signals from each of the long distance networks 2a-2c, via the receiver circuit 19b, the processor 14 of the selection device is arranged, in step 104 of FIG. 5a, to select one of the long distance networks 2a2c, and to store or record the price data concerned from that network for future use in billing. The processor 14 then outputs a corresponding signal on the line 11 to the switch 10 to route any further long distance calls to the selected long distance network in a step 106.

In the comparison and selection step 104, the processor 14 acts primarily to select the lowest price. However, account is preferably also taken of subjective (i.e. user judged) or objective quality of service data; for instance, networks which have transmitted price signals which include quality data indicating an unacceptably low level of quality may simply be ignored; or more typically, for each long distance network, an adjusted price may be calculated as: $P_{adj} = P + a_1 Q_1 + a_2 Q_2 \ldots a_i Q_i$, where $a_1$, $a_2$ etc are predefined constants stored in the memory 18, and $Q_1, Q_2, \ldots Q_i$ are different quality measurements such as delay, BER etc. Rather than using constants, it would instead be possible to provide non-linear weighting of each quality measure using predetermined non-linear functions $F_1, F_2$ etc in the form:

$$P_{adj} = P + F_1(Q_1) + F_2(Q_2) \ldots F_i(Q_i)$$

Furthermore, preferably the processor 14 is arranged to take account of actual previous experiences with each long distance network by recording or storing in the memory 18 data representative of the actual quality of service encountered with each of the long distance operators 2a-2c, for example the actually encountered average BER; the number of customer complaints; the incidence of network interrupt; the level of audible echo and so on. Where long distance operators with no track record are newly encountered, an additional "safety factor" may also be added to the adjusted prices. The 'adjusted prices' thus in general serve as indicators of the desirability (judged in terms of financial value) of each of the long distance operators.

The processor 14 then selects the lowest adjusted price (i.e. price offered, adjusted in accordance with promised quality, and anticipated quality based on past performance). If prices are quoted in different currencies, then as well as taking into account currency conversion rates, the processor 14 may also need to take into account the volatility of the currency exchange rates concerned, and accordingly the store 18 or processor 14 may be linked to receive currency variation data from a financial information service provider.

Referring to FIG. 5b, when the selected pricing device detects that its price is accepted, in step 122, it stores the agreed price for the call in step 104 for later billing. The unselected pricing devices 20 take no further action.

The volume of calls placed with each long distance network 2a-2c at each price (and preferably also individual user data such as usage level) is then logged and stored (e.g. downloaded to a record medium), at an accounts computing device (not shown) connected to the selection device 12 and switch 10, to allow comparison with bills received from the long distance network operators 2a-2c.

The transmitters and receivers 19a, 19b, 29a, 29b are sending relatively small volumes of data; consisting, in each case, of indications of the source and destination of the tender or price message, and a relatively small number of bits indicating the approximate level of demand and/or the approximate level of price and/or predetermined standard types of contractual terms. Accordingly, they may utilise whatever low level signalling channels exist in the networks 1, 2; for example, out of band or tone signalling, or a portion of a packet header in digital packet transmission systems (e.g. an Asynchronous Transfer Mode (ATM) or Synchronous Digital Hierarchy (SDH) System).

As well as, or instead of, the above described polling system in which the customer networks 1a-1c issue tender signals and the supplier networks 2a-2c reply with price level signals, the pricing devices 22 may be arranged to generate new price level signals on a change of market conditions without awaiting a tender signal, and the selection circuits 12 may be arranged to respond thereto.

Needless to say, the long distance operators 2 and regional networks 1 need not be separated; rather, a single entity may offer regional and long distance communications links.

In the foregoing, long term or fixed costs are taken into account. In some embodiments of the invention, it is preferable to have short term knowledge of the moment-to-moment costs of operating the service provider. Thus, the pricing device 20 in such embodiments is connected to account centres within the network 2, and forms frequently updated cost estimates.

In one particular embodiment of this type, the pricing device 20 is arranged to generate a cost estimate in real time (i.e. on receipt of a polling signal) by reading cost data from parts of the network 2 on receipt of a polling signal.

Where the service to be provided by the service provider itself relies upon services provided by another service provider (for instance, at the distant point 3), the pricing device 20 may be arranged, on receipt of a poll signal from a user 1, to itself issue a polling signal to the or each further service provider, so as to obtain an indication of the price to be paid to the further service provider, to be used in calculating a price for the user. On acceptance by the user of the price from the pricing device 20, the pricing device 20 may then signal acceptance to the further service provider.

Second Embodiment

In a second embodiment of the invention, customers (i.e. end users of telecommunications services) are equipped with selection circuits 12, which are arranged to select and connect between one of a plurality of telecommunications service providers in, for example, a city area or other locality or a communications Free Trade Zone (FTZ).

Referring to FIG. 6, customer equipment 300 (for example, a mobile phone) comprises an air interface circuit 301, connected to a radio antenna 302, and to digital cellular mobile phone equipment 303 of the type discussed in, for example, "Wireless Access and the Local Telephone Network", G. Calhoun, Artech House, Norwood, Mass., USA (1992). Also provided is a selector circuit 312, comprising programme and data memories 316, 318; a processor 314 and transmit and receive circuits 319a, 319b intercoupling the processor 314 with the air interface circuit 301.

Figures 7A, 7B, 7C:
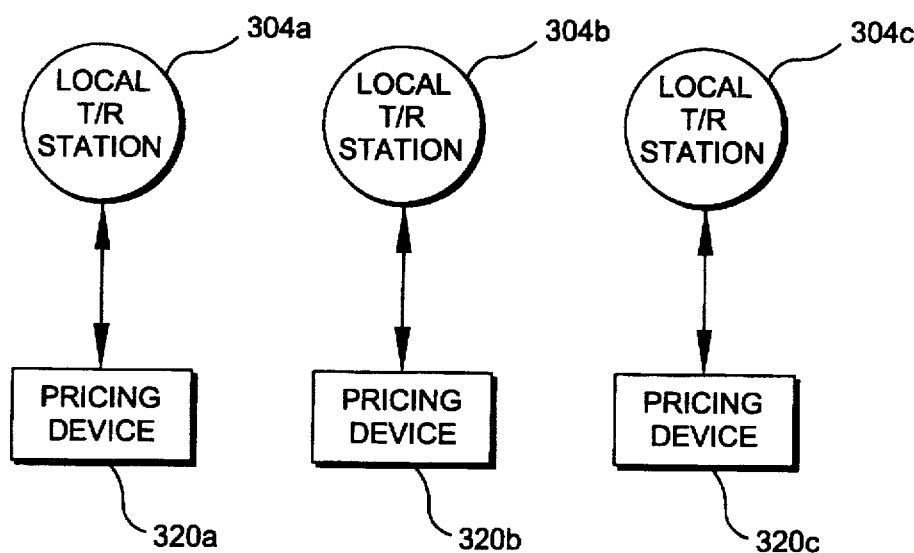
FIGS. 7a, 7b, 7c are block diagrams showing schematically a plurality of telecommunications networks with which the equipment of FIG. 6 is in communication.

Referring to FIGS. 7a, 7b, 7c a number of different radio communications network providers each have local transmit/receive stations 304a, 304b, 304c. For example, all may be offering digital cellular mobile services according to a common standard (e.g. the GSM standard) or some may be operating according to cordless telephone standards (e.g. DECT or CT2).

Connected to each of the stations 304a–304c is a pricing device 320a, 320b, 320c; the pricing devices 320a–c may be at the transmit/receive station, in a digital mobile base station or exchange, or at a central or local network switching or network control station.

For the sake of simplicity, in the following it will be assumed that each of the transmit/receive stations 304a–304c operates on a different band of frequencies, using otherwise compatible signalling procedures.

In this embodiment, the elements making up each of the pricing circuits 320 are the same as those illustrated as making up the pricing device 20 in the first embodiment, and hence will not be repeated for the sake of clarity. The elements making up the selecting circuit 312 of FIGS. 7a, 7b, 7c are functionally the same as those making up the selection device 12 of the first embodiment, but in order that the customer equipment 300 should not significantly be increased in size, the processor 314 comprises a suitably programmed microprocessor or microcontroller device, or may comprise such a device already performing other functions in the equipment 300.

Figure 8:
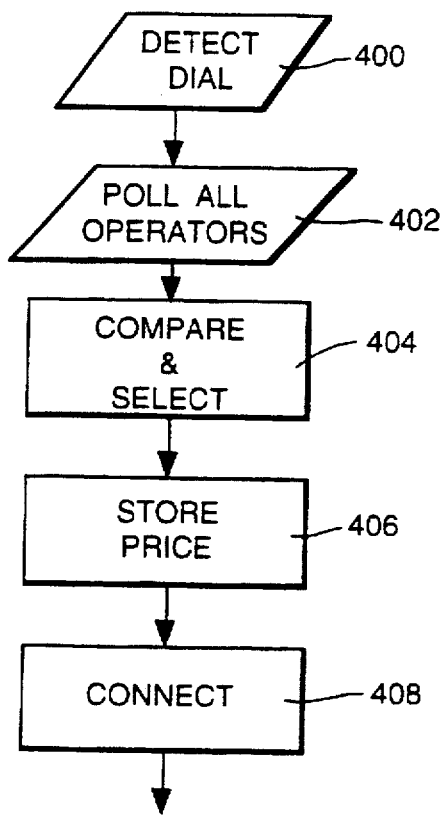
FIG. 8 is a flow diagram showing schematically the process of operation of the equipment of FIG. 6.

Referring to FIG. 8, which corresponds to FIG. 5a, the general operation of this embodiment will now be described.

When the user selects (e.g. dials) a number via user interface circuits 305, 306, this is detected in a step 400 by the selection circuit 312. The processor 314 forms a tender message comprising the country code (if any) and area code of the dialled number; and controls the air interface circuit 301 via the transmit circuit 319a to transmit the tender message to the signalling frequencies of each of the networks 304a, 304b, 304c in a polling step 402. Alternatively, if there is a common signalling channel provided, common to all the network operators 304, the tender message may be broadcast on that frequency.

Each of the pricing devices 320a–320c now follows generally the same process as in FIG. 5b. Likewise, the same pricing equation may be used as in the first embodiment above. Each then transmits back a price level signal (per minute or per bit), together with service type and quality information (e.g. encrypted, half rate/full rate, current BER etc).

Referring once more to FIG. 8, the price messages are received by the processor 314 via the air interface 301 and receiver 319b, and the processor 314 adjusts the various prices as in the first embodiment to take account of service quality factors (and/or other factors), and picks the lowest adjusted price in a step 404. The price and identity of the network operator is then stored in the memory 318 in a step 406, and the air interface 301 is controlled to establish a link with the selected operator for the duration of the call in a step 408.

During the call, the processor 314 counts the current time through the call, multiplies this by the stored charge rate, and may display the current charge rate and cumulative charge on the display 305 for the benefit of the user.

At the termination of the call, the processor 314 may generate a prompt on the display 305 inviting the user to confirm whether the quality of the just finished call has been acceptable by operating the input device (e.g. keypad) 306. In the event that the user should indicate the call to have been unacceptable, an entry is made or updated in the memory 318; e.g. to add a significant uplift to the adjusted price received in future from the operator concerned, so as to make the future selection of that operator less likely.

In this embodiment, in addition to performing the operation of steps 400–408 on an attempt to make an outgoing call by the user, the processor 314 may be arranged to do so at other times also; for example, each time the available channels are scanned as part of the normal registration process within a cellular communications network, or periodically within a call, or when the mobile apparatus 300 moves out of the area of coverage of one of the stations 304 with which it is presently in communication. In this embodiment, the processor 314 may utilise the well established handover procedures which enable a mobile unit 300 to change frequency, change between cells, or change between cellular operators (which are often based, at present, on signal strength criteria). In this case, the received signal strength or bit error rate (BER) may also be utilised in forming an adjusted price comparison as discussed above, as one of the quality indicators $Q_i$.

Third Embodiment

Figure 9:
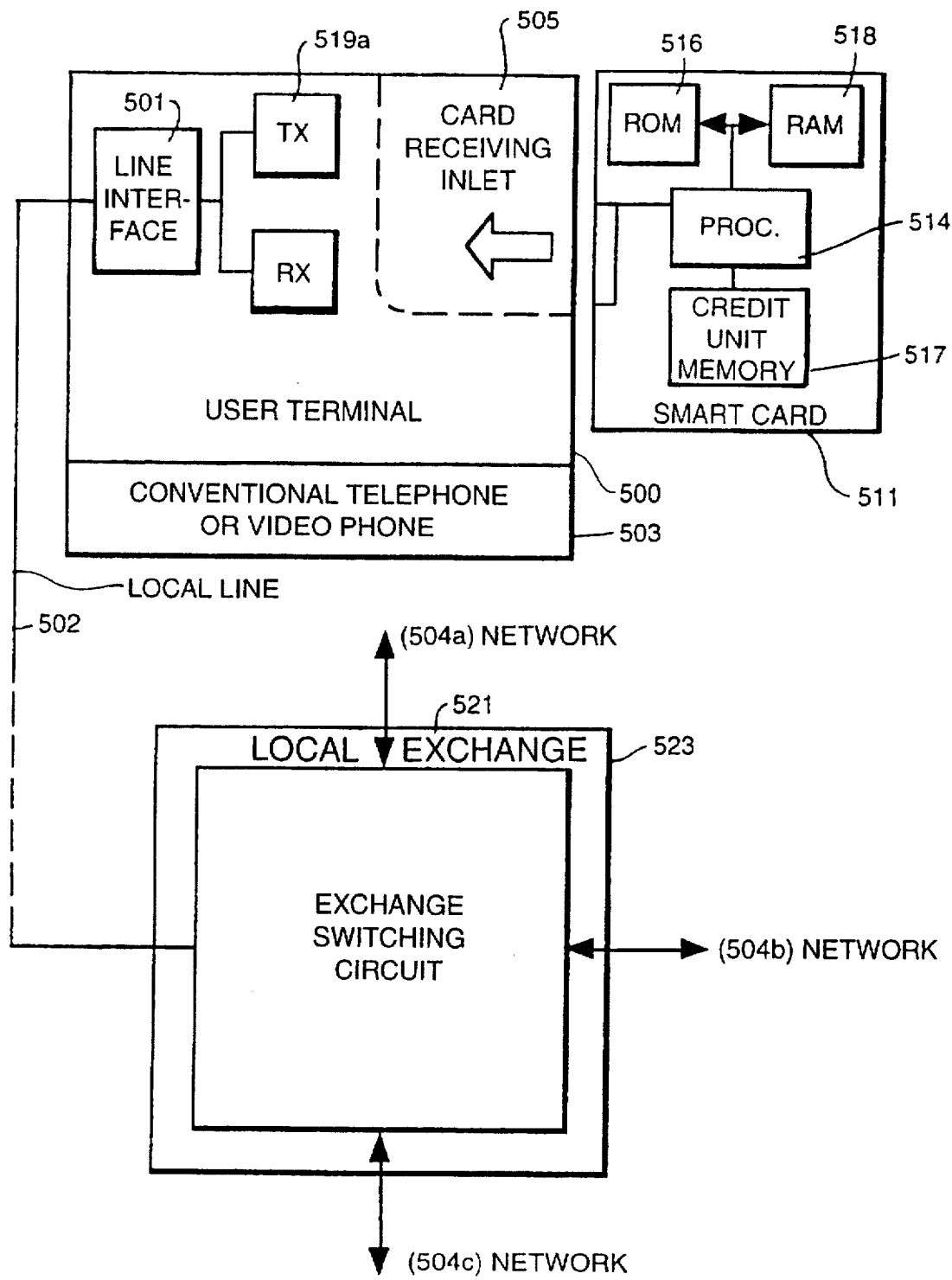
FIG. 9 is a block diagram showing schematically the structure of a third embodiment of the invention.

Referring to FIG. 9, the third embodiment is similar to the second embodiment, but the user terminal 500 in this embodiment may be a fixed terminal such as a telephone or a videophone (e.g. as described in "Digital Signal Processing in Telecommunications" (Ed.) F. A. Westhall & S. F. A. Ip, Chapman & Hall, London (1993)) . It comprises a conventional telephone or videophone apparatus 503, arranged to communicate with a local line 502 via a line interface circuit 501.

In this embodiment, conveniently, much of the selector circuit 512 is provided on a card 511 of the so-called "Smart card" type, carrying the processor 514, programme and data memories 516, 518, and (in this embodiment) a credit unit memory 517 for storing an amount of credit for payment in respect of goods and services. The customer apparatus 500 comprises a card receiving inlet 505 into which the card is insertable, carrying contacts for interconnecting the processor 514 with transmit and receive circuits 519a, 591b which communicate with the line interface circuit 501.

The local loop line 502 (e.g. copper or optical fibre cable, possibly including a wireless link) interconnects the customer apparatus 500 (located, for example, in an office or home) with a local exchange 523. At the local exchange station 523, the exchange switching circuit 521 is arranged not only to respond to normal dial tones, pulses or digits, but also to network selecting tones, pulses, digits or other signals, to interconnect the customer equipment 500 with one of several competing networks 504a, 504b, 504c. For example, at present in the UK, customer premises equipment connected to the network of British Telecommunications plc may carry a tone dialling button the actuation of which by a user causes the local exchange 523 to interconnect the user to equipment owned or leased by the network operated by Mercury Communications plc.

Figure 10:
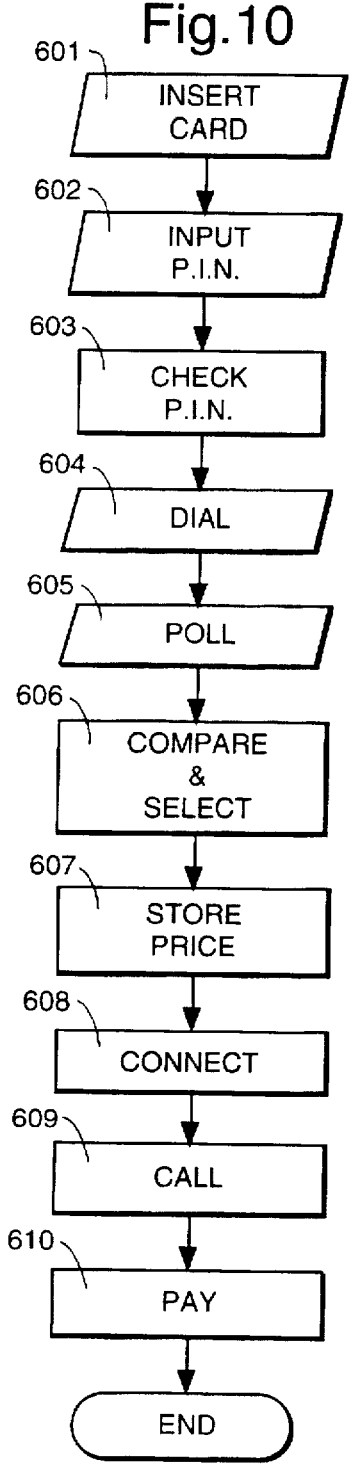
FIG. 10 is a flow diagram showing the process performed by the apparatus of FIG. 9.

In this embodiment, referring to FIG. 10, when a user wishes to initiate a telephone call, he inserts the card 511 into the apparatus 500 (step 601) and initiates a call (e.g. by lifting the handset and dialling). Since, in this embodiment, the card 511 carries credit units which can be used for payment, the process of initiating a call also preferably involves a security or identity validation step in which the user may input (for example) a PIN code which is checked (step 602) against data held in memory 516–518 on the card 511, and the call is only allowed to proceed if the two match (step 603). After the user has dialled the number (in step 604), in a step 605 the processor 514 generates, via the transmit circuit 519a and the line interface circuit 501, a polling signal for each of the available network operators 504a–504c in turn, comprising a network indicating signal, a poll indicating signal, and signals indicating the destination number and the identity of the equipment 500. The local exchange 523 reacts to each of the polling signals in turn, to transmit each to the respective network operator 504a–504c.

Each of the networks 504a–504c contains a respective pricing unit 520 (not depicted), containing functionally the same elements as that shown in FIG. 2 in the first embodiment, and operating in the same manner as the first embodiment or in the second embodiment. Accordingly, on receipt of a polling signal, each of the pricing units 520a–520c (not shown) sends, in reply, a pricing signal indicating the level of charge (per minute, per bit, per packet, per frame of data, per circuit or, in the case of a virtual circuit, per part of circuit) back to the processor 514 via the exchange 523, generally in accordance with the process of FIG. 5b.

On receipt of the price signals, the processor 514 then compares prices and selects (in step 606) the network 504 having the lowest price (adjusted in accordance with the above embodiments), and stores identification data identifying the network and the charge rate in a step 607.

In a step 608 the processor 514 generates, via the transmit circuit 519a and line interface circuit 501, a network selection signal which is transmitted through the local line 502 to the exchange 523. The exchange 523 then, in a conventional manner, connects the telephone equipment 500 to the desired network 504, and the call progresses in a step 609.

At the outset of the call, charging data indicating the identity of the caller (or, more specifically, that of the card 511) is transmitted to the network 504 to enable the network 504 to automatically credit its account in units of credit as the call progresses; similarly, the processor 514 is arranged to debit the credit memory 517 as the call progresses. The processor 514 may be arranged automatically to debit the card 511 at predetermined timing intervals determined by the stored price rate, or the network 504 may transmit conventional charging tones to the telephone apparatus 500 (as in conventional cash or card pay phones) to trigger the processor 514 to debit the credit memory 517. Should the credit memory 517 be empty, the processor 514 is arranged to generate an indication for the user to replenish the credit memory, or to terminate the call.

Rather than employing a "Smart card" credit memory 517, it would equally be possible to employ a card 511 carrying a magnetic stripe storage area of conventional form which stores prepayment credit data, or credit account data (of the type employed on credit cards, for instance), the telephone apparatus 500 being likewise provided with magnetic card reader means.

It would equally be possible for the payment to be effected in a single operation at termination of the call, or on a change of network within the call (if this occurs earlier).

It will be apparent that the provision of payment during or just after the telecommunication service is advantageous in reducing the volume of call data which would otherwise need to be stored by the user (although, of course, historical call cost data may optionally be stored in this embodiment also). This advantage is equally applicable to the earlier embodiments described above. Furthermore, the provision of rapid payment during or just after the provision of the service enables use to be made of brief opportunities (e.g. briefly favourable exchange rate periods) which is particularly useful in the first embodiment, since payment can be made whilst the favourable conditions prevail.

The provision of at least programme data controlling the operation of the processor 514 on a personal card is advantageous in that it enables users to benefit from their experience of different service providers, by storing data on the price and quality of services obtained from providers and using this data in subsequent selection of service providers. Thus, one user who has developed a successful pricing algorithm may sell, hire or disseminate the algorithm on cards to others.

Rather than retaining their personal card, a customer may alternatively allow or require a company (for example a telecommunications operator) to hold their card securely on their behalf, for example for security reasons, in exchange for some payment (e.g. in the form of a commission on the usage by the user). In this case, the entity holding the cards may itself be permitted to amend or improve the pricing algorithm for each user, or to comply with particular user requirements.

In general, the processor 514 could be incorporated into other types of equipment (for example, mobile music reproduction equipment) adapted to be coupled to public or private telecommunications equipment in use.

Fourth Embodiment

In the fourth embodiment, the invention is practised within a telecommunications network, to allow different paths for a message through the network to compete and hence permit the network to organise itself using price criteria.

Figure 11:
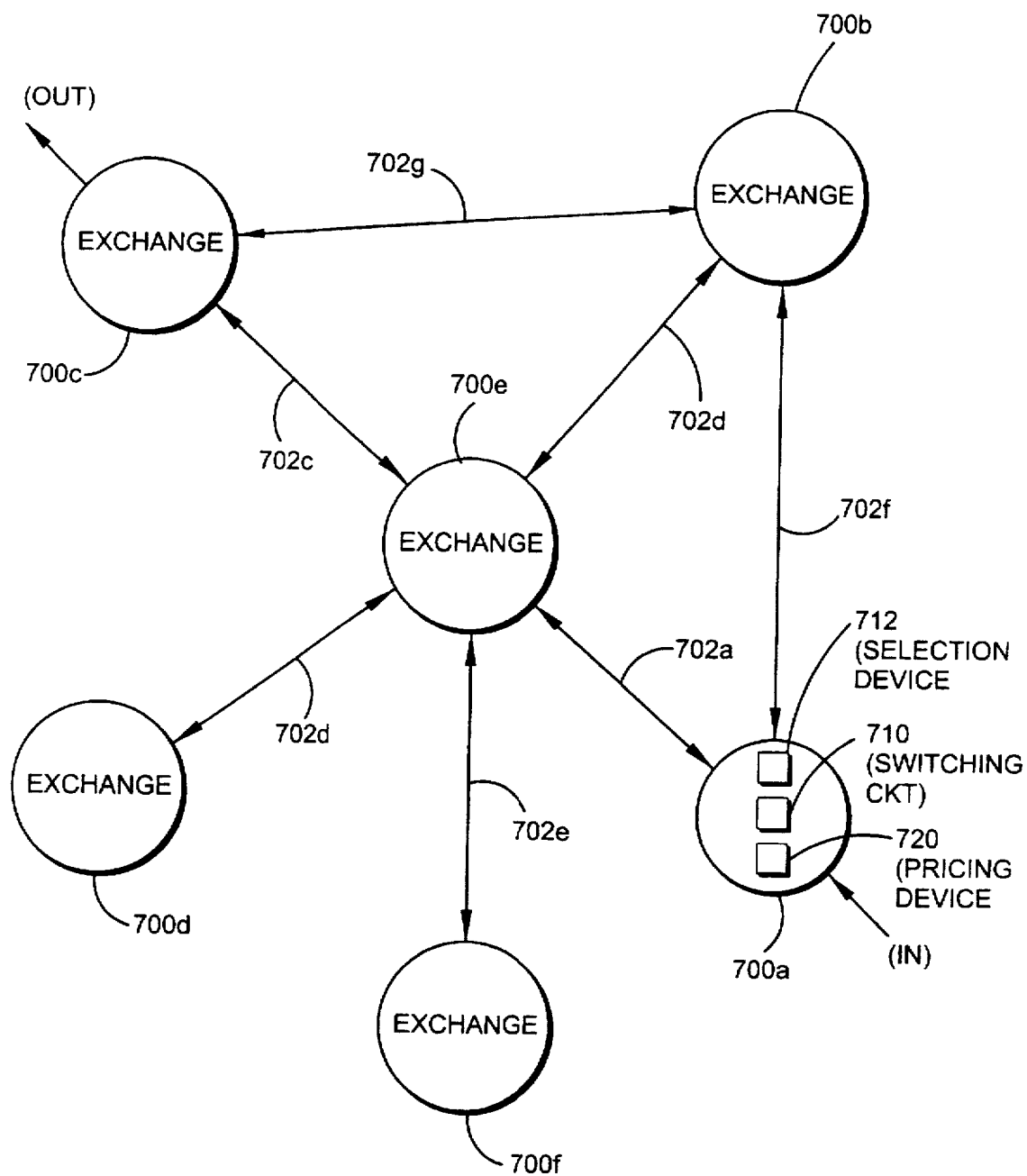
FIG. 11 is a block diagram illustrating the structure of a first telecommunications network according to a fourth embodiment of the invention.

Referring to FIG. 11, a telecommunications network may comprise a plurality of exchanges 700a–700f interconnected by cables (or other communications channels such as radio links) 702a–702g. Each exchange comprises a switching circuit 710 for interconnecting an input cable with one of a number of output cables leading to customer equipment, another exchange 700, or a different network.

Each exchange also comprises a selection device 712 and a pricing device 720.

Each exchange 700 in this embodiment is capable of acting as an individual profit or cost centre, aiming to maximise its own operating profit. When a message is to be transmitted between a node (e.g. user station) connected to a first exchange 700a and a node connected to a second exchange 700c, the exchange 700a polls each of the exchanges 700b.700e to which it is connected via respective channels 702a.702f. The polled exchanges then calculate prices and transmit price signals, in a similar manner to the above embodiments, taking account of costs and current circuit available capacity, and the first (polling) exchange selects the route via the exchange offering the lowest price.

As in the first embodiment, the pricing devices 720 may estimate prices incorporating frequently updated short term cost estimates. The process of determining a cost estimate may in turn require a pricing device to negotiate a price with another element of the network (for example, a trunk line or further exchange) in order to be able to supply a pricing signal, as in the first embodiment.

If both the polling and the selected exchanges are part of a single economic entity, then no actual payment need take place, but the polling exchange is notionally debited by the agreed price and the selected exchange is correspondingly credited, in the sense that a recording on a local or national account system is made after the call.

Thus, traffic through the network of FIG. 11 is controlled by price signals. Over time, busier exchanges will attempt to maximise profit by raising their prices, and so some traffic will spread to less busy exchanges. The network can thus be considered to regulate its own traffic distribution. It would also be possible to provide a procedure for utilising an element of the profit generated at each profit centre to expand that centre, and/or to ensure that the capacity of loss-making centres is cut back, so that the automated price competition between parts of a single economic entity operating a network can play a part in restructuring that network to favour more successful routes.

It will be seen that this embodiment is similar to the first. It differs in that, in this embodiment, components which are operated by a common economic entity, and which are conventionally viewed as cooperating subsystems, are placed in competition one with another as a means of internal traffic allocation.

Figure 12:
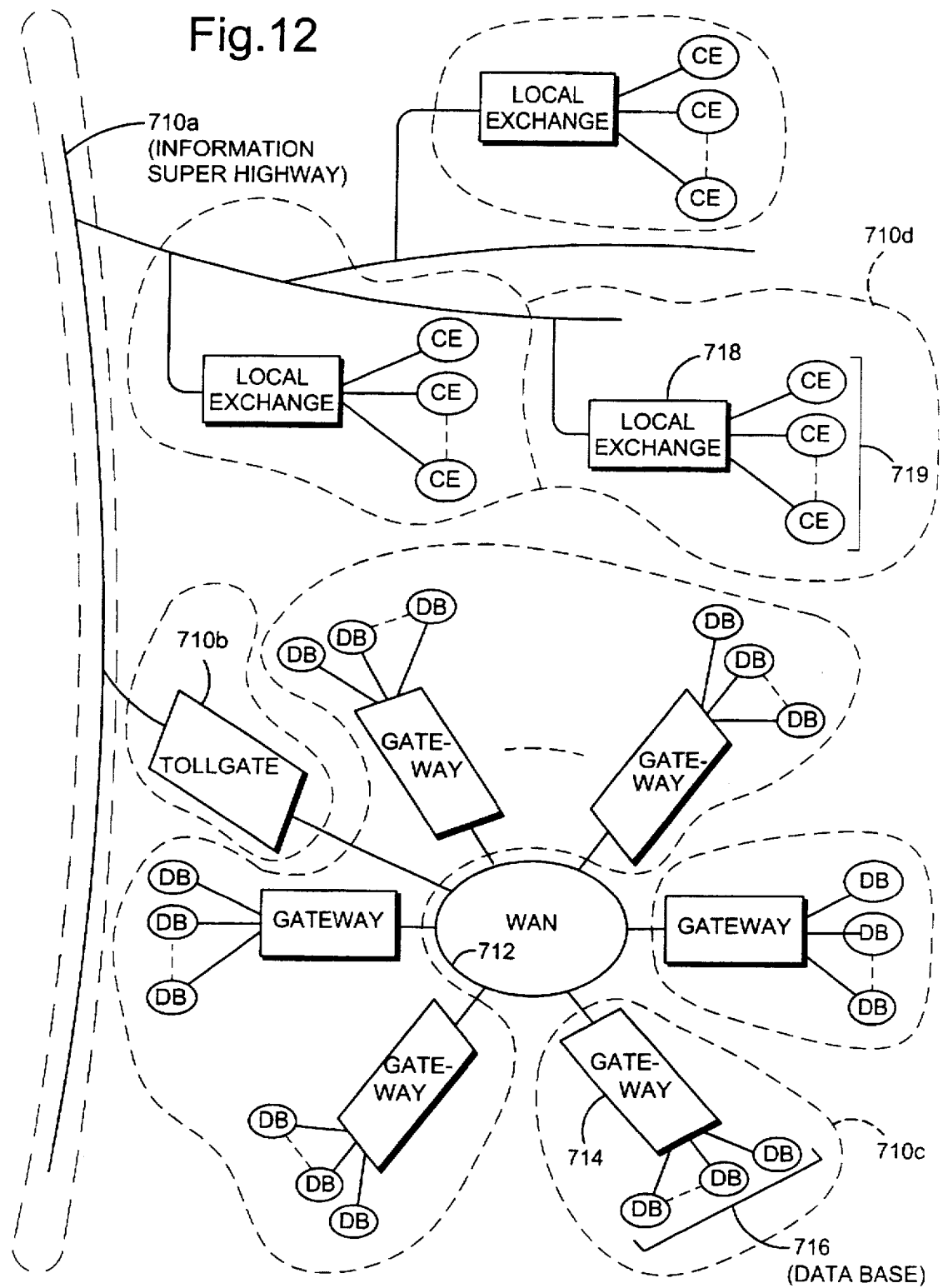
FIG. 12 is a block diagram illustrating the elements of second network according to the fourth embodiment.

Referring to FIG. 12, in this embodiment the profit centres 710a–710h in a network can comprise diverse different elements.

Examples of segments/units which could be operated as profit centres are:
switching exchanges or groups of exchanges
databases or groups of databases
video-on-demand centres
network/service management platforms
application platforms
information superhighways
toll gates into networks or database systems
LANs, MANs and WANs
private networks
individual workstations, computers, multi-media systems
general and specialised directory services
general and specialised information service bureaux.

In FIG. 12, 710a denotes a so-called "information superhighway"; 710b denotes a connection functioning as a tollgate between the information superhighway and a network (for example a WAN); 710c denotes a group of databases 716 connected to the WAN 712 via a gateway 714; and 710d denotes a local exchange 718 connected to a group of customer equipment 719. In each of the cost centre areas (shown ringed by dashed lines in FIG. 12) there is provided a pricing device and a selecting device, generally in accordance with other embodiments. In the embodiment of FIG. 12, the pricing device for each cost centre 710 may be arranged to take account of the cost of a number of elements; for example, the pricing device of the cost centre 710d may take account of not only of the cost of operating the exchange 718 but also the lines connecting the exchange to the consumer equipment 719, and to other exchanges or networks.

The level to which the network is divided into individual cost-centres may vary; over time, it is likely that finer divisions will be sought so as to make greater use of the self-regulating effect of the pricing negotiation process.

As in other embodiments, the selection process in this embodiment preferably takes account of expected or predicted quality or other factors. This embodiment may employ any of the features of the other embodiments, mutatis mutandis.

The pricing signals may be carried by ATM or SDH packet headers. In this embodiment, the invention may be performed by modifying the stored programme control (SPC) sequences of exchanges operating under, for example, the Signal 7 (S7) system intended for intelligent networks (IN).

Fifth Embodiment

In this embodiment, the invention is applied to the provision of goods or services through a telecommunications network, from a plurality of sources interconnected with a user through the network.

Figure 13:
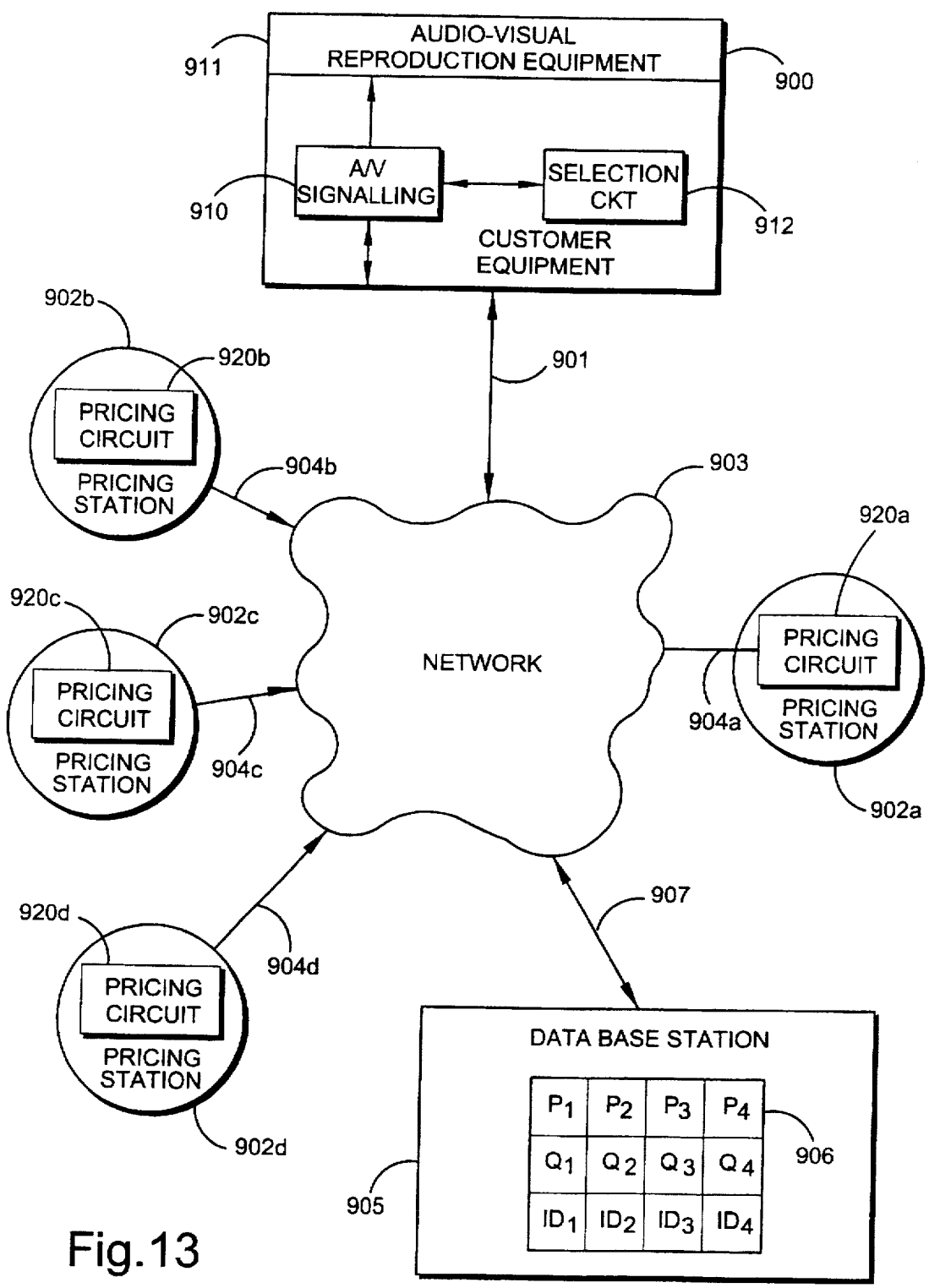
FIG. 13 is a block diagram illustrating the supply of services through a telecommunications network according to a fifth embodiment of the invention.

Referring to FIG. 13, a plurality of service providers (for example, video on demand suppliers) have pricing stations 902a–902d each comprising a pricing circuit 920, and a communications circuit (not shown here) for connection to the network 903 via a respective transmission channel (e.g. local line) 904a. Also provided in the network is a database station 905 comprising a digital store 906 (e.g. RAM) storing a plurality of price data, corresponding to price level signals for each of the pricing stations 906a–906d, the database station 905 being connected to the network 903 via a communications link 907 (e.g. a local line).

Customer equipment 900 comprises audio visual reproduction equipment 911 (for example, a conventional television, or a monitor and audio reproduction circuit); and an audio visual signalling unit 910 suitable for receiving video on demand. Also provided is a selection circuit 912, having generally the same structure as the selection device shown in FIG. 3, FIG. 6 or FIG. 9.

In operation, each of the pricing devices 920a–920d in the respective pricing stations 902a–902d periodically generates estimated prices for video on demand services, based on costs and demand in a manner similar to that described with respect to the first embodiment. Each pricing station 902 then periodically transmits price level data P, together with data (ID) indicating the identity or telephone number to be dialled by the user equipment 900 to obtain video on demand services to which the price relates, together (optionally) with quality data Q indicating, for example, resolution; wide screen/narrow screen format; stereo/mono sound track; or other issues relating to the quality of the service.

Referring to FIG. 14, when a user wishes to obtain video on demand services, he inputs an indication of his desire to do so to the processor 914 of the selection circuit 912. In this embodiment, the selection circuit 912 then generates dial tones or pulses to access, via the network 903, the line 907 leading to the database station 905, and transmits to the database station 905 an indication of the nature of the services required (for example, an indication that a western or horror film is required).

In response, the database station 905 supplies price, identity and quality data, which has previously been supplied by each of the pricing stations 902a–902d. The connection is then suspended, and the selection circuit 912 evaluates the lowest "adjusted" price as in the above described embodiments, taking account of quality of service data and any stored data relating to previously encountered quality and price associated with suppliers having the same identity in the past.

Having made a selection as before, the price rate is stored and the control circuit 914 selects a number indicated by the ID data supplied by the database station 905 to obtain the video on demand services at the quoted price.

The pricing stations 902a–902d may be, but are not necessarily, provided at video supply stations connected to the network 903.

In this embodiment, it will be clear that many different types of services, or indeed goods, could be supplied in the same manner.

In the above described embodiment, a central database (or locally distributed, updated copies thereof) is accessed by the different pricing stations 920 to hold price data. This has some advantages, in that the user equipment 900 need only access a single point rather than communicating with multiple suppliers as in the above embodiments. It also has the advantage that price details may be kept more confidential from other suppliers, by providing that the database station 905 is operated by an independent party (for example a regulatory authority).

Rather than providing a selection circuit 912 in the customer equipment 900, it would be possible to provide instead a selection circuit 912 in the database station 905, which would then make a recommendation to the customer station as to the cheapest or best value currently available, rather than supplying all stored price information relating to different suppliers and enabling the customer equipment 900 to make the decision.

In this case, rather than providing a single selection circuit 912 proffering the same selection to all customer equipment 900, it would be possible for the database station 905 to store data enabling a different selection process to be performed for different users (for example, storing different predetermined constants in the price adjustment equation given in the first embodiment). The database station 905 is thus, in this case, acting somewhat as a "broker" impartially recommending one of a plurality of service providers.

The arrangement of providing a separate database storing price data from a plurality of different suppliers, thus effectively interrupting the direct communication between the selection device and the pricing device, is also applicable to the earlier embodiments in which telecommunications services are provided.

Multi-media

In the above embodiments, audio or audio/video telecommunications services are provided. It is equally possible to apply the invention to multi-media telecommunications services, in which data (e.g. text data) communications channels are provided as well as video and/or audio, in a single telecommunications session. In this case, the user apparatus typically may comprise sound input and output devices (a microphone and a loudspeaker); video input and output devices (a camera and a visual display unit) ; a graphics input device (a mouse, track-ball or stylus/pad combination); document input and output devices (a scanner and a printer); a text input device (a keyboard); and a control or monitor display (a visual display unit typically with a menu or graphical user interface (GUI) such as Windows (TM)) for controlling the user apparatus in conjunction with the text or graphics input device.

A control and processing device or devices (for example a microprocessor such as the Intel 486DX microprocessor and/or a digital processing device such as the Texas Instruments TMSC30) is arranged to process and route data and audio and visual signals between the input and output devices and to and from the line interface circuit, which is adapted to receive and transmit data in a suitable multimedia format (for example an ATM format).

Each data stream (audio, video, text) may be provided via a separate logical channel (typically sharing the same physical cable), and the terms and price of connection over each channel may each be separately negotiated each in the same manner as in the other embodiments. The monitor display may carry an indication of the state of progress of the negotiation for each channel, and/or charging or cost information.

Typically, the user equipment would be provided by a computer work station, with ports for connection to the audio, video and text input and output devices discussed above.

Sixth Embodiment

In the foregoing embodiments, the process of reaching an agreed price between the selection device and the pricing device has been described as being initiated by the selection device whenever a demand for services arises, the selection device operating to select one of a number of proposals from competing pricing devices.

However, the situation may often arise that a telecommunications or other service provider has a surplus of available capacity. The same may equally be true of a user of telecommunication services (for example, a multinational company) who has purchased a capacity in excess of their requirements.

Accordingly, in this embodiment, telecommunications resources are periodically offered as being available, and telecommunication users make competing bids for the available resources. This embodiment is more useful where the user of telecommunications services is a large scale user, with a relatively constant demand (at some level) for telecommunication services, rather than a private individual or other small end-user.

For example, this embodiment is applicable to the situation described with reference to FIG. 1 in the first embodiment, in which plurality of long distance networks 2a–2c offer services to a plurality of local networks 1a–1c.

Referring to FIGS. 14 and 15, in this embodiment each long distance network (service provider) 2 comprises a selector device 820, and each local telecommunications network 1 (service user) comprises a bidding device 812. The bidding device 812 comprises a processor 814, programme and data storage memories 816, 818, and input and output signalling devices 819a, 819b, (functionally corresponding to the equivalent devices 12, 14, 16, 18, 19a, 19b of FIG. 3) and likewise the selection device 820 comprises a processor 824, program and data storage memories 826, 828 and input and output signalling devices 829a, 829b (equivalent to corresponding devices 24, 26, 28, 29a, 29b of FIG. 4).

Referring to FIGS. 16a and 16b, the operation of this embodiment will now be described.

As in the first embodiment, each processor 824 in the long distance network 2 is arranged to periodically derive the available capacity A of the network (on a regular basis, and/or in response to sudden changes in availability of long distance channels) in a step 200. The available resource capacity (e.g. number of channels available) is then transmitted in a step 202 to each of the bidding devices 812 of the local networks 1a–1c (together with, for example, data indicating expected quality of services, channel type, bit rate and so on).

Each of the bidding devices 812 in the local networks 1 receives the resource capacity signal transmitted by the long distance network selection device in a step 210; calculates a price in a step 212; and outputs the calculated price in a step 214.

The selection device 820 receives the price offer signals in a step 204 from each of the local networks 1; compares the prices and selects the highest price in a step 206; and signals acceptance back to the selected local network in a step 208, to indicate entry into a binding contract, for the execution of which an appropriate connection is made.

The local networks 1a–1c each await the reception of an acceptance signal. The local networks which are not selected take no further action, and the local network which receives the acceptance signal connects to the long distance operator in a step 218 to utilize the long distance operator at the price agreed (which is likewise stored in the bidding device 812).

The price calculation step 212 carried out by the bidding device in this embodiment typically comprises a step 220 of assessing demand for the services offered; a step 222 of assessing the current costs of equivalent services being used; a step 224 of assessing stored costs of equivalent services used in the past; and a step 226 of accessing the quality of the services being offered (on the basis of any transmitted quality data and any stored data relating to the quality of services previously received from the same long distance network) as shown in FIG. 16c.

If the demand assessed in step 220 is low because the service on offer is not currently required by many users of the local network 1, the bidding device 812 may simply not calculate a price at all, or may output a low price (in order, for example, to acquire the services for subsequent resale). If the demand assessed in the step 220 is already being substantially met, so that no excess demand exists, the bidding device 812 may calculate the cost based on the cost of the existing services assessed in step 222, by decrementing the existing costs assessed in step 222 (to take account of the cost inherent in changing supplier); and making a positive or negative adjustment based on the quality assessed in step 226 and adjusted to take account of any relevant past cost data assessed in step 224 (e.g. indicating that the particular long distance network is cheaper than the existing supplier in general).

If a large excess demand for the offered services is assessed to exist in step 220 by the processor 814, the processor 814 generally sets the bid price in a direct relationship with the level of excess demand. For example, the processor 814 may assess the maximum possible price which it can afford to pay (i.e. the price at which the network 1 makes no profit from the acquisition of the offered services) in step 228, and set the bid price between the existing service price assessed in step 222 (or a stored past price assessed in 224) and this maximum possible price, in proportion to the fraction of the demand for the offered service which is currently unmet (the excess demand).

Thus, in this embodiment, the bidding device 212 operates generally to calculate the bid price in direct relation to the level of unmet demand which it has for the offered services.

In other aspects, the operation of this embodiment is as described in relation to the first embodiment. The two embodiments are, of course, not exclusive; the processors 812, 824 of this embodiment may also be arranged to comprise the processors 12, 24 of the first embodiment.

This embodiment could equally be utilised in any of the second to fifth embodiments described above.

Seventh Embodiment

The operation of this embodiment is similar to that of the preceding embodiment, in that long distance telecommunications networks 2 (service suppliers) each comprise a selection device 820, and local networks (service users) 1 each comprise a bidding device 812. In this embodiment, however, the selecting device 820 operates more in the manner of an auction.

Referring to FIGS. 17a and 17b, in the embodiment, after the assessing step 200 and the outputting a resource indication signal step 202 (as in the previous embodiment), the selection device 820 in this embodiment is arranged to calculate an initial price in step 250 and to send the price in a step 252 to each of the bidding devices 812 of the local networks 1 in a step 252.

The price calculation step 250 in this embodiment may be essentially the same as in the first embodiment, except that an uplift is added to an initially calculated price, so as to raise it to the highest level at which the resource can realistically be offered.

In this embodiment, each bidding device receives the resource signal in a step 210 and calculates the price which it will be bid for the resource in a step 212, both as in the previous embodiment. However, the price is not output from this embodiment. Instead, the bidding device 812 awaits the price signal from the selection device 820, which is received in a step 254. The received prices are compared with the price calculated in the step 212 in a step 256. If the received price is the same or lower than the calculated price, the bidding device sends, in a step 258, a signal indicating acceptance to the selecting device 820. The selection device 820 waits, for a predetermined interval, for acceptance signals from the bidding devices 812 in a step 260.

When one or more acceptance signals are received, the first acceptance signal is taken to form the supply contract, and a confirmation signal is transmitted back in a step 262. If no acceptance signals are received in the step 260 within a predetermined time, the selection device returns to the step 250 and recalculates a lower price, by decrementing the existing price by a predetermined amount. The following steps are then repeated, either until an acceptance is received from one of the bidding devices 812 or until the price calculated in the calculated step 250 reaches some lower threshold (beneath which it is not economic to offer telecommunication services).

At the bidding device 812, after the transmission of an acceptance in the step 258, the bidding device awaits the receipt of a contract acknowledgement signal in step 264, and subsequently proceeds to connect to the selected long distance operator in the step 218.

If the price signal received in the step 254 is higher than the price calculated in the step 212, the bidding device detects in a step 266 whether a 'contract formed' signal has been transmitted by the selected device 820, signalling the end of the process. If not, the bidding device returns to the step 254 to await the receipt of a lower price signal from the selection device 820.

Although in the above described process a reverse, or "Dutch" auction has been described, it will be apparent that the operation of the bidding and selection devices 812, 820 in FIG. 17a and 17b could readily be modified to carry out a normal auction in which the price signals generated by the selection device are progressively increased until only one bidding device remains active.

Furthermore, the transmissions between the bidding and selection devices may be performed on a common broadcast channel, so that each bidding device can monitor the behaviour of other bidding devices, and alter its future behaviour appropriately.

Although in the above-described 'conventional' auction processes the sequence of price signals monotonically increases or decreases, non-monotonic behaviour might occur in some embodiments.

Eighth Embodiment

In this embodiment, rather than exchanging services for financial payment, an exchange of one class of services for another (or of services for goods or vice versa) is performed.

This embodiment may be performed by the apparatus of the first embodiment, for example. In this embodiment, the selection device 12 performs the steps 100–106 indicated in FIG. 5a. However, at the outset, a step of capacity assessment is performed by the selection device 12, to assess the available capacity of services (e.g. 64 Kilobits/second digital links), and a service with high availability is selected as the medium of payment with which to acquire long distance telecommunication services. The polling signal transmitted in the step 102 in this embodiment therefore indicates that payment will be made in units (e.g. minutes, packets or bits) of an identified service type. The remaining operation of the selection device 12 in this embodiment is as in FIG. 5a, except that the prices compared are in units of call services of the identified class, rather than in terms of money.

Likewise, in FIG. 5b, one of the pricing factors assessed in the step 118 is the demand or value of the offered local service to the long distance network operator. If the value is insignificant, the price calculated by the pricing unit 20 (in units of the indicated local call service), is much higher than if the long distance operator 2 has a demand for (or places a value on) the local service offered as payment.

Thus, in this embodiment, units of one type of telecommunication service (local services) are offered in exchange for units of another type of telecommunication service (long distance services).

In fact, the long distance networks 2 may also offer local services and the local networks 1 may also offer long distance services, so that this embodiment is able to offer inter-operability between competing networks so as to utilise the resources of both.

Equally, the embodiment may be used as a means of allocating resources between local and long distance parts of a single network.

The resources offered in exchange for telecommunications services in this embodiment need not be limited to further telecommunication services; they could, instead, be amounts of payment in different currencies; options to procure telecommunication services at a certain price in future; or other types of assets such as shares.

Other Embodiments

In view of the foregoing, many other alternatives, embodiments and modifications will be apparent.

For example, the pricing processes above may extend over several stages of negotiation, with an initial high price being answered with a low offer, to converge on a price between the two. The bidding, tendering, bartering and auctioning processes described above may thus be extended into more complex combinations of price negotiation. More complex mechanisms for adopting particular tactics (such as estimation of competing bids and undercutting) may be provided.

Multiple selecting devices 12 may communicate with each other to share pricing and quality information received from pricing units, or even to jointly acquire telecommunication services on a shared cost basis. This could in principle lead to complex interactions in the telecommunications service market, causing the possibility of sudden violent or discontinuous price changes as multiple selection devices simultaneously make the same choice at the same price.

Where user apparatus has a visual display device, supplier apparatus may periodically generate 'advertising' messages indicating price, nature or quality and/or availability of service data, and the user apparatus may display such data.

In order to acquire information on competitors prices, telecommunications service providers may emulate the behaviour of selection devices, and issue polling signals in order to gather price information. Such price information may then form the basis for setting prices by pricing devices of that telecommunications supplier. To avoid such behaviours, verification or security procedures may form part of the polling and bidding process.

Rather than using a PIN, it would be possible to use other security checks (e.g. voice recognition). It would be possible to make such security checks intermittently during, as well as before, a transaction.

It may also be desirable to provide regulatory devices, which periodically monitor the prices offered by pricing devices (for example in a particular locality) to detect apparent cartel behaviour in which identical prices are offered by competing suppliers over a prolonged period, or other types of anti competitive behaviour.

User equipment may incorporate a disabling device, selectively remotely operable, to halt such behaviour when it is detected.

Rather than operating deterministic pricing and selection algorithms, the pricing and selection devices may be provided with self learning structures in which prices are calculated, and/or bids are evaluated and compared, using for example "neural network" algorithms (e.g feedforward networks of the multilayer perception or back propagation type or Hopfield networks) based on service availability, demand levels, and historical stored data relating to these and possibly other factors.

Means for allowing manual intervention by a human operator, to override or arbitrate negotiation, may be provided. To this end, means for automatically accessing particular personnel (e.g. advisors or arbitrators) may be provided. Such additional functions may be provided as plug-in modules for attachment to a personal computer or telephone apparatus.

It will be clear that the invention is applicable to the supply of all types of telecommunication services; for example plain old telephone services (POTS); multi-media services; video telephony; fax and digital message communication; and so on. Equally, the invention is applicable to the supply of services via telecommunications; for example video on demand, entertainment services and so on.

Further, the invention may be applied to other resource allocation or service provision domains. For example, an electrical supply grid operating computer may poll a plurality of competing electricity generator operating computers, to arrange, in real-time, the price and terms of the supply of electricity from selected generators via the grid, just as disclosed in the above embodiments. A private telecommunication network could be used, for the price signalling and negotiation, as an alternative to the public network, or alternatively the signal could be superimposed as modulations on the electricity power supply grids, which thus itself acts as a communication network.

The invention is accordingly not limited to the above described embodiments, but extends to all alterations, modifications or improvements within the spirit and scope of the invention.

We claim:

1. A communication system comprising:

at least one telecommunications resource user apparatus;

a plurality of competing telecommunications resource supplier apparatus, each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for detecting an attempt by a said telecommunications resource user apparatus to initiate communications and, in response to said detecting generating and transmitting through the signalling channel a respective competing pricing signal indicative of a pricing level corresponding to the price to be paid for a resource supply transaction via the respective communications circuit, and a selecting device, associated with the telecommunications resource user apparatus and connected to the signalling channel, for receiving each said pricing signal, and selecting a corresponding one of said transactions on the basis of said pricing signals, and signalling to the respective telecommunications resource supplier apparatus to open the respective communications circuit based upon said selection;

the pricing device and selecting device being arranged to generate and transmit a sequence of said pricing signals in a respective dialogue, to negotiate a said pricing level.

2. A communication system comprising:

at least one telecommunications resource user apparatus;

a plurality of competing telecommunications resource supplier apparatus each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for detecting an attempt by a said telecommunications resource user apparatus to initiate communications and, in response to said detecting, generating and transmitting through the signalling channel a respective competing pricing signal indicative of a pricing level corresponding to the price to be paid for a resource supply transaction via the respective communications circuit; and a selecting device, associated with the telecommunications resource user apparatus and connected to the signalling channel, for receiving each said pricing signal and selecting a corresponding one of said transactions on the basis of said pricing signals; and signalling to the respective telecommunications resource supplier apparatus to open the respective communications circuit based upon said selection;

the pricing level signals being indicative of a quantity of a payment resource representing an exchange of telecommunications services rather than money.

3. A communications system, comprising:

at least one telecommunications resource user apparatus;

a plurality of competing telecommunications resource supplier apparatus, each selectively operable to open a respective communications circuit to said telecommunications resource user apparatus:

a signalling channel interconnecting said telecommunications resource user apparatus and each of said plurality of telecommunications resource supplier apparatus;

a pricing device associated with each said telecommunications resource supplier apparatus and connected to the signalling channel, for generating and transmitting through the signalling channel a respective competing pricing signal indicative of a pricing level corresponding to the price to be paid for a resource supply transaction via the respective communications circuit, and a selecting device, associated with the telecommunications resource user apparatus and connected to the signalling channel, for receiving each said pricing signal, and selecting a corresponding one of said transactions on the basis of said pricing signals, and signalling to the respective telecommunications resource supplier apparatus to open the respective communications circuit based upon said selection;

the or each selecting device being arranged to store data indicative of a level of performance of the resource supplied by each telecommunications resource supplier apparatus, and is for selecting a said telecommunications resource supplier apparatus based jointly upon said stored data and said pricing levels.

4. A communication system comprising:

at least one telecommunications resource user apparatus;

a plurality of competing telecommunications resource supplier apparatus, each selectively operable to open a respective communications circuit to said telecommunications resource user apparatus;

a signalling channel interconnecting said telecommunications resource user apparatus and each of said plurality of telecommunications resource supplier apparatus;

a pricing device associated with each said telecommunications resource supplier apparatus and connected to the signalling channel, for detecting an attempt by a said telecommunications resource user apparatus to initiate communications and, in response to said detecting, generating and transmitting through the signalling channel a respective competing pricing signal indicative of a pricing level corresponding to the price to be paid for a resource supply transaction via the respective communications circuit; and a selecting device, associated with the telecommunications resource user apparatus and connected to the signalling channel, for receiving each said pricing signal, and selecting a corresponding one of said transactions on the basis of said pricing signals; and signalling to the respective telecommunications resource supplier apparatus to open the respective communications circuit based upon said selection;

each telecommunications resource supplier apparatus being arranged to generate and transmit feature signals indicative of technical characteristics of the resource it supplies so that said selecting device can use said feature signals as a part of the selection decision process.

5. A system according to claim 4, in which the technical characteristics relate to the quality of the resource.

6. A communications system comprising:

at least one telecommunications resource user apparatus;

a plurality of competing telecommunications resource supplier apparatus, each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for generating and transmitting through the signalling channel a respective competing pricing signal indicative of a pricing level corresponding to the price to be paid for a resource supply transaction via the respective communications circuit, and a selecting device associated with the telecommunications resource user apparatus and connected to the signalling channel, for receiving each said pricing signal, and selecting a corresponding one of said transactions on the basis of said pricing signals, and signalling to the respective telecommunications resource supplier apparatus to open the respective communications circuit based upon said selection, each telecommunications resource supplier apparatus being arranged to generate and transmit signals indicative of technical characteristics of the resource it supplies, the selecting device being arranged for selecting a said telecommunications resource supplier apparatus based jointly upon the technical characteristics and the pricing levels.

7. The system of claim 6, in which the selecting device is arranged to calculate an arithmetic combination depending jointly upon said technical characteristics and said pricing levels, and to select said telecommunications resource supplier apparatus based upon said arithmetic combination.

8. A communications system comprising: at least one telecommunications resource user apparatus;

a plurality of competing telecommunications resource supplier apparatus, each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for generating and transmitting through the signalling channel a respective competing pricing signal indicative of a pricing level corresponding to the price to be paid for a resource supply transaction via the respective communications circuit, and a selecting device associated with the telecommunications resource user apparatus and connected to the signalling channel for receiving each said pricing signal and selecting a corresponding one of said transactions on the basis of said pricing signals, and signalling to the respective telecommunications resource supplier apparatus to open the respective communications circuit based upon said selection;

the or each telecommunications resource user apparatus using telecommunications resources to supply telecommunications services to further users, the telecommunications resource supplier apparatus and the telecommunications resource user apparatus comprise a single commonly owned and controller telecommunications network, comprising means for crediting payment to the telecommunications resource supplier apparatus from the telecommunications resource user apparatus.

9. A communication system comprising:

at least one telecommunications resource user apparatus;

a plurality of competing telecommunications resource supplier apparatus each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for detecting an attempt by a said telecommunications resource user apparatus to initiate communications and, in response to said detecting, generating and transmitting through the signalling channel a respective competing pricing signal indicative of a pricing level corresponding to the price to be paid for a resource supply transaction via the respective communications circuit; and a selecting device, associated with each telecommunications resource user apparatus and connected to the signalling channel, for receiving each said pricing signal, and selecting a corresponding one of said transactions on the basis of said pricing signals; and signalling to the respective telecommunications resource supplier apparatus to open the respective communications circuit based upon said selection;

each telecommunications resource user apparatus including customer terminal equipment for use by an individual customer and at least one of said selecting devices.

10. A system according to claim 9, in which the telecommunications resource user apparatus comprises an input device to input security data from a user, the system further comprising a memory containing stored data and being arranged to perform a security check to validate a user thereof prior to operation utilizing said security data and said stored data.

11. The system of claim 10, in which the input device is a keypad and the security data is a PIN.

12. The system of claim 9, in which the customer terminal equipment comprises a store which stores, for each resource supply transaction, the identity of the selected telecommunications resource supplier apparatus and the price level.

13. The system of claim 9, in which the customer terminal equipment comprises a cellular telephone and the signalling channel and each communications circuit include a radio channel.

14. The system of claim 9, in which the customer terminal comprises a computer work station for communicating audio, video and text data.

15. A communications system comprising:

at least one telecommunications resource user apparatus;

a plurality of competing telecommunications resource supplier apparatus, each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for generating and transmitting through the signalling channel a respective competing pricing signal indicative of a pricing level corresponding to the price to be paid for a resource supply transaction via the respective communications circuit, and a selecting device, associated with the telecommunications resource user apparatus and connected to the signalling channel, for receiving each said pricing signal, and selecting a corresponding one of said transactions on the basis of said pricing signals, and signalling to the respective telecommunications resource supplier apparatus to open the respective communications circuit based upon said selection;

the or each telecommunications resource user apparatus comprising customer terminal equipment for use by an individual customer, the telecommunications resource user apparatus comprising an insertable and removable portion carrying at least part of said pricing device, and a receiving inlet via which the insertable and removable portion being insertable and removable by a user without dismantling the telecommunications resource user apparatus.

16. A communications system comprising:

a plurality of competing telecommunications resource user apparatus;

at least one telecommunications resource supplier apparatus which is selectively operable to open a respective communications circuit to a selected one of said telecommunications resource user apparatus;

a signalling channel, interconnecting each of said plurality of telecommunications resource user apparatus and said telecommunications resource supplier apparatus;

a pricing device associated with each said telecommunications resource user apparatus and connected to the signalling channel, for generating and transmitting through the signalling channel a respective competing pricing signal indicative of a pricing level corresponding to the price to be paid for a resource supply transaction via the communications circuit; and a selecting device, associated with the telecommunications resource supplier apparatus and connected to the signalling channel, for receiving each said pricing signal, and selecting a corresponding one of said telecommunications resource user apparatus on the basis of said pricing signals; and controlling the telecommunications resource supplier apparatus to open the respective communications circuit to the selected telecommunications resource user apparatus based upon said selection.

17. A system according to claim 16, in which the selecting device is arranged to transmit a sequence of signals indicative of a monotonically time-varying series of prices, and each said pricing device is arranged to receive said sequence of signals, and to transmit a pricing level acceptance signal when a received signal indicates a price corresponding to a predetermined level.

18. A system according to claim 16, in which the or each pricing device is arranged to calculate said pricing level based upon the level of demand of its associated telecommunications resource user apparatus for the resource.

19. A system according to claim 16, in which the or each pricing device is arranged to store data indicative of previous price levels for comparable resources.

20. A system according to claim 16, in which the pricing device and selecting device are arranged to generate and transmit a sequence of said pricing signals in a responsive dialogue, to negotiate a said pricing level.

21. A system according to claim 16, in which the or each telecommunications resource user apparatus further comprises means for using telecommunications resources to supply telecommunications services to further users.

22. A system according to claim 21, in which the telecommunications resource supplier apparatus and the telecommunications resource user apparatus comprise a single commonly owned telecommunications network, further comprising means for crediting payment to the telecommunications resource supplier apparatus from the telecommunications resource user apparatus.

23. The system of claim 16, in which the selecting device transmits an initiating signal on said signalling channel prior to each resource supply transaction.

24. The system of claim 16, in which the telecommunications resource user apparatus comprises customer terminal equipment for use by an individual customer.

25. The system of claim 24, in which the customer terminal equipment comprises a cellular telephone and the signalling channel and each communications circuit includes a radio channel.

26. The system of claim 24, in which the customer terminal comprises a computer work station for communicating audio, video and text data.

27. The system of claim 16, in which the telecommunications resource user apparatus comprises an electronic payment device to transmit charging data signals, to enable credit in respect of said pricing level, via said signalling channel.

28. A telecommunications system comprising:

a telecommunications circuit provider apparatus providing a telecommunications circuit;

a telecommunications circuit user apparatus selectively connectable to said telecommunications circuit;

a first price negotiating device associated with the telecommunications circuit provider apparatus for generating and signalling a first sequence consisting of a plurality of price signals indicative of a price to be paid for use of said telecommunications circuit, and for receiving a second said sequence of said price signals;

a second price negotiating device associated with the telecommunications circuit user apparatus for generating and signalling said second sequence of price signals, and for receiving said first sequence of said price signals; and a price signalling circuit interconnecting the first and second price negotiating devices, for carrying said price signals;

each of said negotiating devices performing an acceptance decision on the basis of a received said price signal, and signalling a further price signal in reply, whereby said first and second price signals form a responsive dialogue to negotiate a price level.

29. The system of claim 28, in which said price signals include an acceptance signal indicating acceptance of the price indicated by the preceding price signal.

30. The system of claim 28, in which said first price negotiating device is arranged to generate said first sequence of prices as a monotonic sequence of prices, until receipt of a price signal of said second sequence indicating acceptance of the preceding price signal of said first sequence, and said second price negotiating device is arranged to perform said acceptance decision on each price signal of said first sequence and to generate said acceptance signal in response to an acceptable price.

31. The system of claim 28, in which said second price negotiating device is arranged to generate said second sequence of prices as a monotonic sequence of prices, until receipt of a price signal of said first sequence indicating acceptance of the preceding price signal of said second sequence, and said first price negotiating device is arranged to perform said acceptance decision on each price signal of said second sequence and to generate said acceptance signal in response to an acceptable price.

32. A communications system comprising:
   at least one telecommunications resource user apparatus;
   a plurality of competing telecommunications resource supplier apparatus, each selectively operable to open a respective communications circuit to said telecommunications resource user apparatus;
   a signalling channel, interconnecting said telecommunications resource user apparatus and each of said plurality of telecommunications resource supplier apparatus;
   a pricing device associated with each said telecommunications resource supplier apparatus and connected to the signalling channel, for generating and transmitting through the signalling channel a respective competing pricing signal indicative of a pricing level corresponding to the price to be paid for a resource supply transaction via the respective communications circuit, and
   a selecting device, associated with the telecommunications resource user apparatus and connected to the signalling channel for receiving each said pricing signal, and selecting a corresponding one of said transactions on the basis of said pricing signals, and signalling to the respective telecommunications resource supplier apparatus to open the respective communications circuit based upon said selection;
   wherein the or each telecommunications resource user apparatus comprises customer terminal equipment for use by an individual customer,
   wherein the telecommunications resource user apparatus comprises an insertable and removable portion carrying at least part of said pricing device and a receiving inlet via which the insertable and removable portion is insertable and removable by a user without dismantling the telecommunications resource user apparatus, and
   wherein the insertable and removable portion comprises a data-carrying card.

33. A telecommunications network comprising a first subsystem and a plurality of competing second subsystems via each of which the first subsystem may communicate, in which the second subsystems each include a price signalling circuit for signalling a price to be paid to the first subsystem and the first subsystem comprises a selecting device for selecting one of the second subsystems on the basis of the price signals, the first subsystem and the second subsystems comprising a single commonly owned and controlled telecommunications network, further comprising a billing system for arranging payment to the selected second subsystem from the first subsystem.

34. A control device for a telecommunications resource user apparatus, said control device comprising:
   means for connecting said control device to a signalling channel,
   means for generating and broadcasting, through the signalling channel to a plurality of telecommunications resource supplier apparatus having respective associated communications circuits via any of which the telecommunications resource user apparatus is selectively connectable to communicate a competing pricing signal indicative of a pricing level corresponding to the price to be paid for a resource supply transaction via the communications circuit;
   means for receiving an acceptance signal from one of said telecommunications resource supplier apparatus, and
   means for initiating communication via the circuit associated with that apparatus.

35. A communication system comprising:
   at least one telecommunications resource user apparatus;
   a plurality of competing telecommunications resource supplier apparatus, each selectively operable to open a respective communications circuit to said telecommunications resource user apparatus;
   a signalling channel, interconnecting said telecommunications resource user apparatus and each of said plurality of telecommunications resource supplier apparatus;
   a pricing device associated with each said telecommunications resource supplier apparatus and connected to the signalling channel, for detecting an attempt by a said telecommunications resource user apparatus to initiate communications and, in response to said detecting generating and transmitting through the signalling channel a respective competing pricing signal indicative of a pricing level corresponding to the price to be paid for a resource supply transaction via the respective communications circuit; and
   a selecting device associated with the telecommunications resource user apparatus and connected to the signalling channel, for receiving each said pricing signal, and selecting a corresponding one of said transactions on the basis of said pricing signals; and signalling to the respective telecommunications resource supplier apparatus to open the respective communications circuit based upon said selection;
   the telecommunications resource user apparatus including an electronic payment device to transmit charging data signals to enable credit in respect of said pricing level, via said signalling channel.

36. A method of communicating via a telecommunications network which includes at least one telecommunications service user apparatus and a plurality of competing telecommunications services suppliers each of which is selectively operable to open a respective communications channel to the telecommunications service user, the method comprising the steps of:
   signalling from said telecommunications service user to each of said telecommunications service providers to indicate a requirement for telecommunications service use;
   calculating and signalling, in real time response to each new indicated requirement for telecommunications service use. a respective price level from each of said plurality of telecommunications service providers to said telecommunications service user;

selecting, at the telecommunications service user, one of said telecommunications service providers based on said signalled price levels;

opening a communications circuit between said telecommunications service user and said selected telecommunications service provider; and effecting payment of the price level signalled by the selected telecommunications service provider.

37. The method of claim 36 in which said step of effecting payment consists of transmitting electronic charging signals via said telecommunications network to enable crediting in respect of said price level.

38. The method of claim 36 further comprising the step of storing data representing said selected telecommunications service provider and said price.

39. A method of communicating as in claim 36 wherein said calculating and signalling step includes at at least one telecommunication service provider:

signalling to further supplier apparatus, receiving price signals from said further supplier apparatus, and including said received price signals in the calculation of the pricing signal to be conveyed to the resource user apparatus.

40. A method of communicating via a telecommunications network which consists of a plurality of competing telecommunications service users and at least one telecommunications services supplier selectively operable to open a respective communications channel to each telecommunications service user, the method comprising the steps of:

signalling from said telecommunications service supplier to each of said telecommunications service users to indicate an available capacity for telecommunications service use;

signalling a respective price level from each of said plurality of telecommunications service users to said telecommunications service supplier;

selecting, at the telecommunications service supplier, one of said telecommunications service users based on said signalled price levels;

opening a communications circuit between said telecommunications service supplier and said selected telecommunications service user; and effecting payment of the price level signalled by the selected telecommunications service user.

41. The method of claim 40 in which said step of effecting payment consists of transmitting electronic charging signals via said telecommunications network to enable crediting in respect of said price level.

42. A communications system comprising:

at least one telecommunications resource user apparatus;

a plurality of competing telecommunications resource supplier apparatus, each selectively operable to open a respective communications circuit to said telecommunications resource user apparatus;

a signalling channel, interconnecting said telecommunications resource user apparatus and each of said plurality of telecommunications resource supplier apparatus;

a pricing device associated with each said telecommunications resource supplier apparatus and connected to the signalling channel, for detecting an attempt by a said telecommunications resource user apparatus to initiate communications and, in response to each said detecting of a new attempt to initiate communications, calculating and transmitting through the signalling channel a respective competing pricing signal indicative of a pricing level corresponding to the price to be paid for a resource supply transaction via the respective communications circuit; and a selecting device, associated with the telecommunications resource user apparatus and connected to the signalling channel, for receiving each said pricing signal, and selecting a corresponding one of said transactions on the basis of said pricing signals, and signalling to the respective telecommunications resource supplier apparatus to open the respective communications circuit based upon said selection.

43. A communications system as in claim 42 wherein said pricing device includes:

means for signalling to further supplier apparatus, receiving price signals from said further supplier apparatus, and including said received price signals in the calculation of the pricing signal to be conveyed to the resource user apparatus.

* * * * *